United States Patent
Hyodo et al.

(10) Patent No.: US 6,695,895 B2
(45) Date of Patent: Feb. 24, 2004

(54) FUEL VAPOR HANDLING APPARATUS AND DIAGNOSTIC APPARATUS THEREOF

(75) Inventors: Yoshihiko Hyodo, Gotemba (JP); Mamoru Yoshioka, Susono (JP); Takanobu Kawano, Okazaki (JP); Hideaki Itakura, Okazaki (JP); Masaki Takeyama, Okazaki (JP); Naoya Kato, Ama-gun (JP)

(73) Assignees: Toyota Jidosha Kabushiki Kaisha, Toyota (JP); Nippon Soken, Inc., Nishio (JP)

( * ) Notice: Subject to any disclaimer, the term of this patent is extended or adjusted under 35 U.S.C. 154(b) by 50 days.

(21) Appl. No.: 10/120,558

(22) Filed: Apr. 12, 2002

(65) Prior Publication Data

US 2002/0162457 A1 Nov. 7, 2002

(30) Foreign Application Priority Data

May 2, 2001 (JP) ........................................ 2001-135026
Jul. 26, 2001 (JP) ........................................ 2001-226436

(51) Int. Cl.$^7$ .......................... F02M 25/08; B01D 53/04
(52) U.S. Cl. .............................. 96/111; 96/112; 96/114; 96/116; 96/146; 123/519
(58) Field of Search ........................... 96/109, 111, 112, 96/113, 114, 115, 116, 146, 147; 55/385.3; 123/518, 519, 520, 521

(56) References Cited

U.S. PATENT DOCUMENTS

| | | | | | |
|---|---|---|---|---|---|
| 5,755,854 | A | * | 5/1998 | Nanaji | 95/11 |
| 5,931,141 | A | * | 8/1999 | Chino | 123/520 |
| 6,014,958 | A | * | 1/2000 | Miwa et al. | 123/520 |
| 6,067,967 | A | * | 5/2000 | Kidokoro et al. | 123/516 |
| 6,279,548 | B1 | * | 8/2001 | Reddy | 123/520 |
| 6,478,849 | B1 | * | 11/2002 | Taylor et al. | 95/11 |

FOREIGN PATENT DOCUMENTS

| | | | |
|---|---|---|---|
| JP | 5-312113 A | * | 11/1993 |
| JP | 9-268952 A | * | 10/1997 |
| JP | 11-30158 A | | 2/1999 |
| JP | 2900704 B2 | | 3/1999 |

* cited by examiner

*Primary Examiner*—Frank M. Lawrence
(74) *Attorney, Agent, or Firm*—Oliff & Berridge PLC

(57) ABSTRACT

A fuel vapor handling apparatus supplies a purging air to a canister by using a purge pump and purges fuel desorbed from the canister into an intake pipe. A controller intermittently operates the purge so that the canister internal temperature recovers from a reduced level caused by the latent heat of vaporization of fuel during an operating period of the purge pump. Therefore, desorption of fuel from the canister during an operating period is facilitated. Since the actual operating time of the purge pump is reduced, the life of a motor that is a power unit of the purge pump becomes longer.

28 Claims, 25 Drawing Sheets

FUEL VAPOR HANDLING APPARATUS AND DIAGNOSTIC APPARATUS THEREOF

INCORPORATION BY REFERENCE

The disclosures of Japanese Patent Applications Nos. 2001-135026 filed on May 2, 2001 and 2001-226436 filed on Jul. 26, 2001, including their specifications, drawings and abstracts, are incorporated herein by reference in their entireties.

BACKGROUND OF THE INVENTION

1. Field of Invention

The invention relates to a fuel vapor handling apparatus of an internal combustion engine, and to a diagnostic apparatus of the fuel vapor handling apparatus.

2. Description of Related Art

Internal combustion engines that use a high-volatile fuel, such as gasoline or the like, are equipped with a fuel vapor handling apparatus for preventing fuel vapor formed in a fuel tank from being released into the atmosphere. Fuel vapor handling apparatus equipped with a canister are widely known. A canister is formed by a container and a fuel adsorption-capable adsorbent contained in the container. Fuel vapor introduced from the fuel tank via a fuel vapor introducing port is temporarily adsorbed to the adsorbent. If negative pressure is caused in an intake pipe due to operation of the internal combustion engine, atmospheric air is supplied into the canister via an atmospheric port due to the negative pressure, so that fuel desorbs from the adsorbent, and is purged into the intake pipe via a purge port. The purged fuel is drawn into engine cylinders together with intake air, thus forming a portion of the air-fuel mixture.

In direct injection type internal combustion engines that conduct stratified charge combustion, or internal combustion engines installed in hybrid vehicles that use an electric motor and an internal combustion engine as drive power sources, the degree of opening of a throttle valve is set to a value relatively shifted to a fully-open side, and therefore there may be a case where the negative pressure used to purge the fuel vapor adsorbed to the canister lacks. Hence, the fuel vapor purge capability is reduced. A technology is proposed (for example, in Japanese Patent Application Laid-Open No. 5-340315) which makes up for insufficient negative pressure in the intake pipe by providing a purge pump on an atmospheric port side or on a purge port side, and increasing the pressure at the side of the atmospheric port of the canister or increasing the negative pressure at the side of the purge port so as to accelerate the supply of air into the canister.

Another technology that adjusts the amount of purge by changing the strength of rotation of a purge pump is proposed in Japanese Patent Application Laid-Open No. 11-30185.

However, the aforementioned technologies described in Japanese Patent Application Laid-Open Nos. 5-340315 and 11-30185 are not necessarily practical if accessory loss and the life spans of the purge pump and its power output section are taken into consideration.

SUMMARY OF THE INVENTION

It is one object of the invention to provide a practical fuel vapor handling apparatus having a purge pump.

In accordance with a first aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. The apparatus supplies air into the canister via the atmospheric port by using a purge pump, and purges a fuel desorbed from the adsorbent into the intake pipe via the purge port. The fuel vapor handling apparatus further includes a controller that controls the purge pump. The controller is set so that the purge pump intermittently operates.

Due to the intermittent operation, the canister internal temperature, which is reduced by the latent heat of vaporization at the time of desorption of fuel during an operating period, rises due to heat transferred from a canister-installed atmosphere and the like during a non-operating period between operating periods. Thus, desorption of fuel is facilitated. Therefore, fuel can be purged efficiently. Furthermore, corresponding to the amount of non-operating periods, the actual operating time of the purge pump is reduced, and the life of the purge pump increases. Practicality thus improves.

In the first aspect described above, the fuel vapor handling apparatus may further include a heater that heats an interior of the canister.

Therefore, during a non-operating period, the canister internal temperature can be sufficiently recovered from a temperature level to which it was reduced during the operating period. Hence, the purging can be more efficiently performed. Corresponding to an enhanced recovery from a reduced canister internal temperature, the load on the purge pump is reduced. Therefore, a low-output purge pump will suffice, and the life of the purge pump can be further increased.

In the first aspect, the controller may control a purge valve that changes between a connection between the canister and the intake pipe and a disconnection between the canister and the intake pipe, as well as the purge pump. In addition, the controller may be set so that the purge pump and the purge valve intermittently operate, and so that a timing at which the purge valve opens is delayed a predetermined time from a timing at which the purge pump turns on.

Since the timing at which the purge valve opens is delayed from the timing at which the purge pump turns on, a period during which the amount of flow of air becomes unstable due to a delay in starting the purge pump is excluded from the actual purge period. Therefore, the linearity of the amount of purge flow relative to the length of the open period of the purge valve improves. Hence, the amount of purge can be precisely controlled.

In the first aspect, the controller may control a purge valve that changes between a connection between the canister and the intake pipe and a disconnection between the canister and the intake pipe, as well as the purge pump. In addition, the controller may be set so that the purge pump and the purge valve intermittently operate, and so that a timing at which the purge valve closes and a timing at which the purge pump turns off are substantially synchronous.

Since the purge valve closes substantially simultaneously with the turning off of the purge pump, a period following the turning off of the purge pump during which the amount of flow of air ejected gradually decreases and does not become constant is excluded from the actual purge period. Therefore, the linearity of the amount of purge flow relative to the length of the open period of the purge valve improves. Hence, the amount of purge can be precisely controlled.

In the above-described aspect, the controller may be set so that a timing at which the purge valve closes and a timing at which the purge pump turns off are substantially synchronous.

In addition to the exclusion of the period during which the amount of flow of air becomes unstable due to a delay in starting the purge pump from the actual purge period, the purge valve closes substantially simultaneously with the turning off of the purge pump, so that the period following the turning off of the purge pump during which the amount of flow of air ejected gradually decreases and does not become constant is also excluded from the actual purge period. Therefore, the linearity of the amount of purge flow relative to the length of the open period of the purge valve improves. Hence, the amount of purge can be precisely controlled.

In the first aspect, the controller is set so as to determine a number of on/off repetitions of the purge pump so that a cumulative amount of actual operating durations during an intermittent operation increases as an instructed purge amount increases.

If the cumulative amount of actual operating durations is prescribed in accordance with the instructed purge amount so as to use the purge pump in a restricted manner, the life of the purge pump can be increased. If a heater is provided, the cumulative amount of actual operating durations can be further reduced due to the desorption accelerating effect of the heater. Therefore, the substantial life of the purge pump can be increased. It also becomes possible to adopt a simple brush motor or the like as a power source of the purge pump.

In the first aspect, the fuel vapor handling apparatus may further include a fuel vapor concentration sensor that is provided in an intermediate portion of a passage extending from the purge port to the intake pipe and that detects a concentration of the fuel vapor. The controller is set so as to stop operating the purge pump if the concentration of the fuel vapor reaches a pre-set purge completing concentration.

Therefore, since the concentration of fuel vapor is successively monitored, it becomes possible to avoid an event in which the purge pump operates with a low purge efficiency caused by a reduced concentration of fuel vapor. Hence, the life of the purge pump can be increased. Furthermore, it becomes possible to properly set a purge period regardless of the property of fuel, or environmental factors, such as the ambient temperature and the like.

In the first aspect, the fuel vapor handling apparatus further includes a purge flow adjustor that adjusts an amount of flow of a purge toward the intake pipe, and a fuel vapor concentration sensor that is provided in an intermediate portion of a passage extending from the purge port to the intake pipe and that detects a concentration of the fuel vapor. The controller may be set so as to compute an amount of purged fuel based on the amount of flow of the purge caused by the purge pump and a result of detection by the fuel vapor concentration sensor, and so as to determine the amount of flow of the purge so that the amount of purged fuel becomes within a pre-set range. The purge flow adjustor may adjust the drive voltage of the purge pump, the duty of the purge valve, or the degree of opening of a metering valve provided at an ejection side or a suction side of the purge pump.

Therefore, a constant amount of purged fuel can always be caused to flow into the intake pipe.

In the above-described aspect, the fuel vapor handling apparatus may further include a heater that heats an interior of the canister. The controller controls the heater and the purge pump, and is set so as to start operating the heater if the amount of purged fuel is not brought into the predetermined range by an operation of the purge pump while the heater is in a non-operation state.

If the amount of purged fuel is small, the purge pump is operated at a maximum capability. If the amount of purged fuel is still less than the lower limit of the predetermined range, operation of the heater is started. By operating the heater in such a restricted manner, the electric power consumption can be reduced.

In the above-described aspect, the fuel vapor handling apparatus may further include a remaining fuel sensor that detects an amount of fuel remaining in the fuel tank. The controller is set so as to stop operating the heater if the amount of fuel remaining becomes less than a pre-set lower limit amount.

For example, if the lower limit amount is set slightly greater than a remaining amount at which refueling is required, a state where the internal temperature of the canister, that is, the temperature of the adsorbent, has decreased and good adsorption performance is possible can be obtained at the time of refueling during which fuel vapor is likely to be produced.

In the above-described aspect, the fuel vapor handling apparatus may further include a fuel vapor concentration sensor that is provided within a passage extending from the purge port to the intake pipe and that detects a concentration of the fuel vapor. The controller is set so as to stop operating the heater if the concentration of the fuel vapor becomes lower than a pre-set lower limit concentration.

If the concentration of fuel vapor is lower than the lower limit concentration, it is considered that the amount of fuel adsorbed to the adsorbent in the canister is small, and the operation of the heater is stopped. Therefore, the electric power consumption is reduced, and the loss of power available for accessories can be reduced.

In the above-described aspect, the fuel vapor handling apparatus may further include a tank internal pressure sensor that detects an internal pressure of the fuel tank. The controller is set so as to stop operating the heater if the internal pressure of the fuel tank becomes lower than a pre-set lower limit pressure.

If the fuel tank internal pressure is lower than the lower limit pressure, it is considered that the inflow of fuel vapor from the fuel tank to the canister is small, an the operation of the heater is stopped. Therefore, the electric power consumption is reduced, and the loss of power available for accessories can be reduced.

In accordance with a second aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. The apparatus further includes a metering valve whose degree of opening is variable and which adjusts an amount of flow of the purge pump, and a controller that controls the metering valve and adjusts the degree of opening of the metering valve.

Therefore, the amount of purge can be adjusted in accordance with the degree of opening of the metering valve. Since the amount of ejection flow of the purge pump is adjusted by the metering valve, there is no need to provide a construction for adjusting the magnitude of power generated by a power unit of the purge pump, for example, a circuit for adjusting the amount of electricity supplied to the motor, that is, a power unit. Therefore, the construction is simplified, and practicality improves.

In accordance with a third aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. The apparatus further includes a heater that heats an interior of the canister, and a controller that controls the purge pump and the heater. The controller is set so as to operate the heater before starting operating the purge pump.

Since before a purge, the temperature in the canister is raised so as to facilitate desorption of fuel from the adsorbent, the purge can be efficiently performed. Furthermore, the load on the purge pump is reduced. Therefore, a low-output purge pump suffices, and the life of the purge pump can be increased. Thus, practicality improves.

In accordance with a fourth aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. The apparatus further includes a controller that controls the purge pump, and a refueling detecting sensor that detects whether the fuel tank has been refueled. The controller is set so that the purge pump starts operating when refueling is performed.

Since refueling causes production of a great amount of fuel vapor, performing a purge following refueling achieves good purging efficiency. Since the purge pump stops operating at the elapse of a predetermined period, the life of the purge pump can be increased. Thus, practicality improves.

Since the stop timing of the purge pump (i.e., the timing at which the purge pump is stopped) is prescribed by the concentration of fuel vapor, it becomes possible to properly set a purge period regardless of the property of fuel, or environmental factors, such as the ambient temperature and the like.

In accordance with a fifth aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. The apparatus further includes a controller that controls the purge pump, and a fuel vapor concentration sensor that is provided within a passage extending from the purge port to the intake pipe, and that detects a concentration of the fuel vapor. The controller is set so that the purge pump starts operating if the concentration of the fuel vapor exceeds a pre-set concentration.

Since a purge is performed when a great amount of fuel vapor is produced, the purge can be efficiently performed, and the life of the purge pump can be increased. Thus, practicality improves.

In accordance with a sixth aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. The apparatus further includes a controller that controls the purge pump, and a fuel vapor concentration sensor that is provided within a passage extending from the purge port to the intake pipe and that detects a concentration of the fuel vapor. The controller is set so as to compute an amount of purged fuel based on the amount of flow of a purge and a result of detection by the fuel vapor concentration sensor, and is set so that the purge pump operates if the concentration of the fuel vapor exceeds a pre-set concentration.

Since a purge is performed when a great amount of fuel vapor is produced, the purge can be efficiently performed, and the life of the purge pump can be increased. Thus, practicality improves.

In accordance with a seventh aspect of the invention, a fuel vapor handling apparatus includes a fuel vapor introducing port connected to a fuel tank, a purge port connected to an intake pipe of an internal combustion engine, and a canister which is formed by a container containing an adsorbent that adsorbs a fuel vapor from the fuel tank, and which has an atmospheric port that is open to an atmospheric pressure. Using a purge pump, the fuel vapor handling apparatus supplies air into the canister via the atmospheric port, and purges a fuel desorbed from the adsorbent into the intake pipe via the purge port. In this apparatus, the purge pump is of a circumferential flow type in which an impellor rotatably disposed in a pump housing is driven by a motor connected to an end of a shaft of the impellor so as to transfer a rotational energy of the impellor to the air sucked via a suction opening and moving through the pump housing to an ejection opening. A connecting portion between the impellor and a rotating shaft of the motor has a structure in which the impellor and the rotating shaft are slidable in a thrust direction, and in which contact surfaces of the impellor and the rotating shaft of the motor have a slip stopper portion that is oblique to a direction of a circumference about the rotating shaft of the motor, and in which a gap is formed between a surface of the impellor and a surface of the rotating shaft of the motor that face each other in the thrust direction.

The impellor has a play in the direction of thrust with respect to the motor rotating shaft, within the range of the gap. Therefore, even if the motor deviates in position in the direction of thrust, interference between the impellor and the housing is avoided. Therefore, no overload occurs on the motor, and the purge can be efficiently performed. Furthermore, the life of the purge pump can be increased. Thus, practicality improves.

In the above-described aspect, bearings of the impellor may be provided on opposite sides of a body portion of the impellor.

Since the impellor is journaled at two end sides, the axis of the impellor does not incline, and interference between the impellor and the housing is avoided. Therefore, avoidance of overload on the motor is further ensured.

In an eighth aspect of the invention, a diagnostic apparatus for detecting an operation abnormality of the fuel vapor handling apparatus described above as any one of the first to seventh aspects includes an actuator, a pressure sensor and a controller. The controller controls a purge valve that changes a connection between a canister and an intake pipe and a disconnection between the canister and the intake pipe. The pressure sensor detects a pressure in a closed space that is formed upon the disconnection from the intake pipe caused by the purge valve, and that includes the canister and a fuel tank, and which outputs a detection signal to the controller. The controller pressurizes the closed space by operating the purge pump while the purge valve is closed, and determines an operation state of the purge pump based on an increasing rate of the pressure detected by the pressure sensor.

If the purge pump is normal, the pressure in the closed space is increased at a predetermined increasing rate by operation of the purge pump. However, if the purge pump is abnormal and its air ejecting capability drops, the pressure increasing rate becomes less the normal rate. Therefore, it becomes possible to determine a state of operation of the purge pump based on the pressure increasing rate.

In the above-described aspect, the controller may be set so as to compare the pressure detected by the pressure sensor with a target pressure, and compare a time of operation of the purge pump during a closed state of the purge valve with a pre-set upper limit time. Furthermore, the controller may be set so as determine that the purge pump has an operation abnormality if the time of operation of the purge pump becomes longer than the upper limit time while the detected pressure is below the target pressure.

A reduction in the increasing rate of the pressure in the closed space prolongs the time needed before the target pressure is reached. Therefore, if the operating time of the purge pump with the purge valve closed becomes longer than the upper limit time, it can be determined that the purge pump has an operation abnormality.

In a ninth aspect of the invention, a canister purge system includes a canister that adsorbs a fuel vapor from a fuel tank of an internal combustion engine, a vapor passage that connects a space formed above a fuel liquid surface in the fuel tank to the canister, a purge passage that connects the canister and an engine intake passage, an atmospheric port that places the canister and an atmosphere in communication, a purge pump that supplies a gas from the intake passage to the canister via the purge passage, and that is operable independently of an operation of the engine, and purge pump controller that supplies the fuel vapor remaining in the engine intake passage into the canister by operating the purge pump after the engine stops.

That is, the purge pump is provided for supplying fuel vapor residing in the engine intake passage to the canister. The purge pump is driven by a drive power source, such as an electric motor or the like, which is operable independently of operation of the engine. Therefore, the purge pump can be operated even after the engine stops. Hence, fuel vapor produced in the intake passage after a stoppage of the engine is delivered to the canister by operating the purge pump, so that fuel vapor adsorbs to the adsorbent in the canister. Therefore, release of fuel vapor from the intake passage after the engine stops can be prevented.

In the ninth aspect of the invention, the purge pump may be a reversible pump, and the purge pump controller may operate the purge pump in a forward direction so as to supply the fuel vapor from the canister to the engine intake passage via the purge passage during an operation of the engine, and the purge pump controller may operate the purge pump in a reverse direction to supply the fuel vapor remaining in the engine intake passage into the canister after the engine stops.

In this construction, the purge pump is a pump capable of forward operation and reverse operation. If the purge pump is operated forward during an operation of the engine, the direction of flow of gas that passes through the pump becomes such a direction as to cause fuel vapor from the canister to the intake passage, so that the purging of the canister is performed. If the purge pump is reversely operated after the engine stops, gas moved through the pump flows in such a direction from the intake passage toward the canister, so that fuel vapor residing in the intake passage is adsorbed by the canister. Therefore, using a single purge pump, atmospheric discharge of fuel vapor can be prevented during operation of the engine and after the engine stops.

In the ninth aspect, the purge pump may be disposed in the purge passage.

In this construction, therefore, the purge pump is disposed on the purge passage connecting the intake passage and the canister. In this case, during forward operation of the pump, fuel vapor in the canister is delivered into the intake passage via the pump provided in the purge passage. During reverse operation of the pump, fuel vapor in the intake passage flows through the pump in the reverse direction, and is delivered to the canister.

In the ninth aspect, the purge pump may be connected to the atmospheric port of the canister.

In this construction, the purge pump is connected to the atmospheric port of the canister. In this case, during forward operation of the pump, the pump delivers atmospheric air into the canister, and desorbs fuel vapor adsorbed to the canister, so that a mixture of fuel and air flows into the intake passage via the purge passage. If the pump is reversely operated, air from which fuel vapor has been removed by the canister is drawn from the canister, so that negative pressure occurs in the canister. Therefore, fuel vapor remaining in the intake passage flows into the canister via the purge passage.

In the ninth aspect, the purge pump controller may suspend an operation of the purge pump if an engine temperature after the engine stops is at most a predetermined temperature.

Therefore, if the engine temperature after a stoppage of the engine is lower than or equal to the predetermined temperature, operation of the purge pump is suspended. If the engine temperature is low, the temperature of an intake passage wall surface is correspondingly low. Therefore, if the engine temperature is low, the vapor pressure of fuel in the intake passage is also low, so that fuel remaining in the intake passage becomes less likely to vaporize. During this state, substantially no fuel vapor is released from the intake passage to the outside. Therefore, even if the purge pump is stopped, atmospheric discharge of fuel vapor does not occur. Hence, according to the invention, if the engine temperature has dropped to a level that allows substantially no atmospheric discharge of fuel vapor, the pump drive energy can be reduced by stopping the purge pump.

The engine temperature can be detected by, for example, directly measuring the temperature of an intake passage wall surface. It is also possible to detect at least one of the cooling water temperature, the intake air temperature, the intake air temperature in the intake passage, etc. and to use them as parameters that indicate the engine temperature.

In the ninth aspect, the purge pump controller may continue operating the purge pump for a predetermined operation time after the engine stops, and then stop operating the purge pump. In addition, the purge pump controller may set the predetermined operation time shorter if an engine temperature after the engine stops is higher.

Therefore, the purge pump is operated only while fuel vapor is present in the intake passage. The amount of fuel vapor produced in the intake passage increases with increases in the engine temperature occurring after the engine stops. Therefore, if the engine temperature after a stoppage of the engine is high, the fuel vapor remaining in the intake passage vaporizes into fuel vapor within a relatively short time. Hence, if the purge pump is operated after a stoppage of the engine, the entire amount of fuel remaining in the intake passage is adsorbed in the form of fuel vapor by the canister in a shorter time if the engine temperature is higher. After that, no more fuel vapor is produced in the intake passage. In this invention, the purge pump is operated only for a period during which fuel vapor is produced in the intake passage. Therefore, the pump drive energy can be reduced.

In the ninth aspect, the purge pump controller may start operating the purge pump after a predetermined delay time elapses following a stoppage of the engine, and the purge pump controller may set the predetermined delay time based on an engine temperature occurring when the engine stops.

Therefore, operation of the purge pump is started at a timing at which the fuel vapor produced in the intake passage actually reaches a connecting portion between the purge passage and the intake passage. The purge pump sucks fuel vapor from the intake passage via the purge passage. However, although fuel vapor is mainly produced near an intake port of the intake passage, the connecting portion (purge opening) between the intake passage and the purge passage is remote from the intake port. Therefore, a delay time occurs before the fuel vapor produced near the intake port reaches the purge opening. This delay time becomes short if the engine temperature is high and fuel vapor is rapidly produced in a great amount after a stoppage of the engine. This delay time becomes relatively long if the engine temperature is low and the amount of fuel vapor produced is small. In this embodiment, the delay time in operating the purge pump is set based on the engine temperature occurring at the time of stoppage of the engine. Therefore, operation of the purge pump can be started at the timing at which fuel vapor actually reaches the purge opening. Hence, it becomes possible to operate the purge pump at a truly needed timing. Therefore, the energy for driving the pump can be reduced.

In the ninth aspect, if after a stoppage of the engine, there is an engine temperature rise above an engine temperature occurring at the stoppage of the engine, the purge pump controller may operate the purge pump in accordance with the engine temperature rise.

Therefore, if the engine temperature increases after a stoppage of the engine, the purge pump is reversely operated. For example, if the engine temperature at a stoppage of the engine is low, the fuel remaining in the intake port mostly remains in the intake port without vaporizing. Therefore, operation the purge pump during the stoppage of the engine will not eliminate fuel remaining in the intake port. However, if the engine temperature (intake port temperature) becomes higher than the temperature occurring at the time of the stoppage of the engine due to the effect of an air temperature rise, radiation heat of direct sunlight or the like, fuel remaining in the intake port during low temperatures may vaporize and fuel vapor may be discharged from the intake passage into the atmosphere. In the invention, in order to prevent discharge of fuel vapor due to a rise in engine temperature, the purge pump is operated in accordance with an engine temperature rise above the temperature occurring at the time of the stoppage of the engine, if there is any temperature rise. The aforementioned "the purge pump is operated in accordance with an engine temperature rise" includes not only starting operating the purge pump if the temperature rises by at least a certain amount, but also changing the operating duration of the pump in accordance with, for example, the size of increase in temperature, or operating the purge pump every time the engine temperature increases by a predetermined amount after the engine stops. In this aspect of the invention, since the purge pump is operated in accordance with an increase in the engine temperature after the stoppage of the engine, atmospheric discharge of fuel vapor can be reliably prevented even if the engine temperature at the time of a stoppage of the engine is low and fuel liquid remains in a relatively great amount in the intake port.

In the ninth aspect, the canister purge system may further include a diagnostic apparatus which, after a stoppage of the engine, causes the purge pump to operate in the reverse direction by using the purge pump controller, and thereby adjusts an internal pressure of a purge system that includes the purge passage, the canister and the fuel tank, to a value that provides a pressure difference relative to an atmospheric pressure, and which, after the internal pressure is adjusted, closes the purge system, and determines whether the purge system has a leak based on a change that occurs in the internal pressure of the purge system after the purge system is closed.

Therefore, a pressure difference between the purge system and the atmosphere can be caused by operating the purge pump in the reverse direction when it is to be determined whether the purge system has a leak after a stoppage of the engine. For example, when it is determined whether the purge system has a leak, the purge system internal pressure is adjusted to a positive pressure or a negative pressure that causes a pressure difference relative to the atmospheric pressure, and a change in the purge system internal pressure caused by entrance of air into the purge system via a leak or exit of gas from the system into the atmosphere via a leak is measured. In this manner a diagnostic operation is performed.

In this case, due to a diagnostic performed by causing a difference in pressure between the purge system and the atmosphere through a reverse operation of the purge pump, entrance of fuel vapor from the purge system into the intake system is prevented. For example, in a construction in which the purge pump is disposed in the purge passage, air is drawn from the intake passage, and is delivered into the canister by reversely operating the purge pump, so that the purge system has a positive pressure. In a construction in which the purge pump is connected to the atmospheric port, a negative pressure is caused in the canister by discharging air from the canister into the atmosphere. Therefore, in either one of the constructions, a flow from the intake passage toward the canister is formed when the purge pump is reversely operated. Therefore, during performance of a diagnostic operation, fuel vapor in the canister or the purge system does not enter the intake passage.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

FIRST EMBODIMENT

Figure 1:
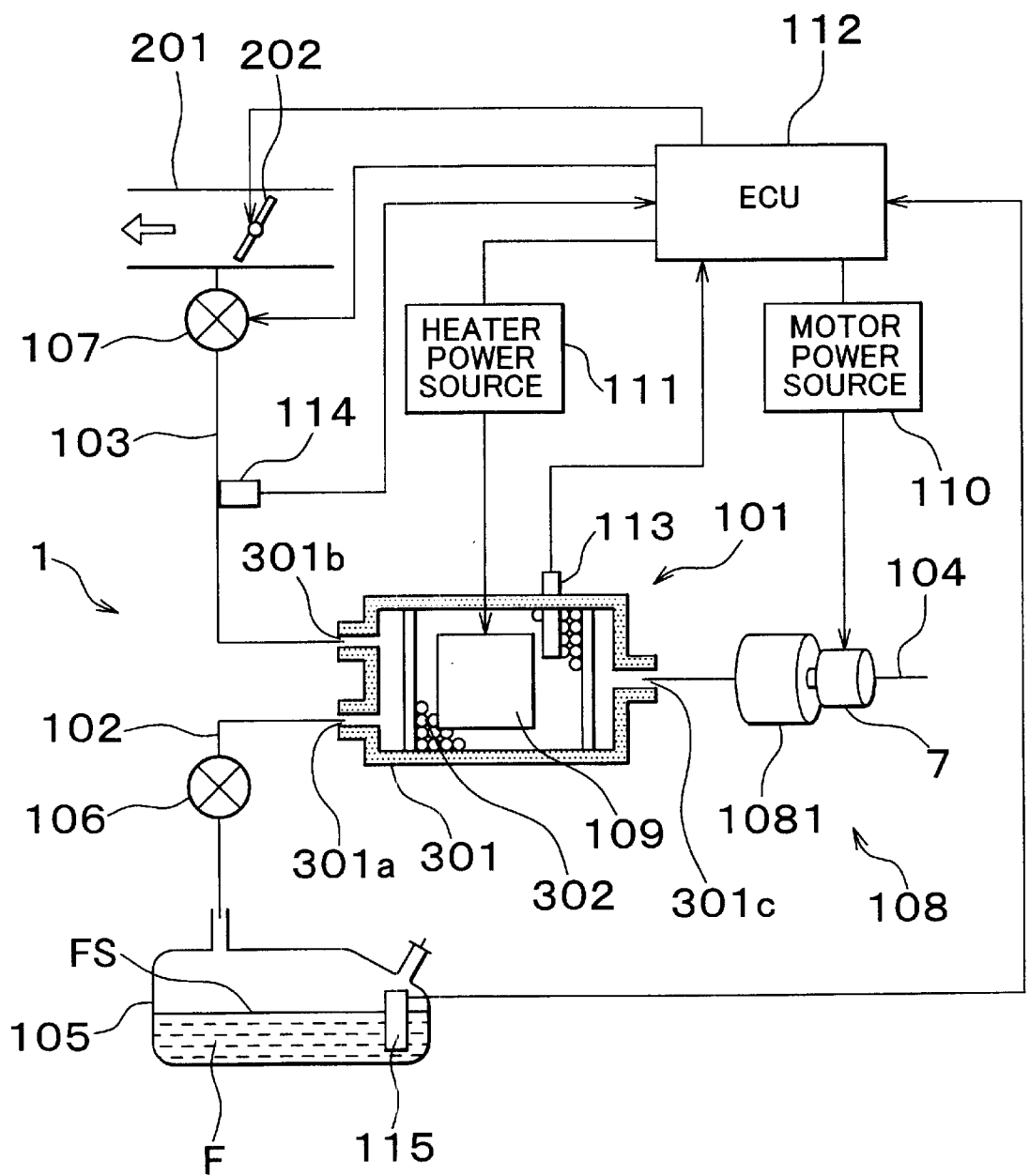
FIG. 1 is a diagram illustrating a construction of a first embodiment of a fuel vapor handling apparatus of the invention.

A fuel vapor handling apparatus in accordance with the invention will be described below with reference to the drawings. FIG. 1 illustrates a fuel vapor handling apparatus of the invention provided for an internal combustion engine. A canister 101 of the fuel vapor handling apparatus 1 is formed by a container 301 filled with an adsorbent 302, such as activated carbon or the like. The container 301 has a fuel vapor introducing port 301a, a purge port 301b and an atmospheric port 301c. The canister 101 has a heater 109 for heating the interior of the canister 101, and a thermocouple 113 for detecting the temperature in the canister 101. The heater 109 and the thermocouple 113 are embedded in the adsorbent 302 contained in the container 301.

The canister 101 and a fuel tank 105 are connected via a fuel vapor introducing passage 102, connecting at one end to the fuel vapor introducing port 301a. A internal pressure valve 106 is provided within the fuel vapor introducing passage 102. The internal pressure valve 106 is a relief valve that is designed so that when the differential pressure across the internal pressure valve 106 in the fuel vapor introducing passage 102 becomes equal to or greater than a predetermined value due to an increased amount of fuel vapor in the fuel tank 105, the valve is opened to place the canister 101 and the fuel tank 105 in communication with each other and introduce fuel vapor from the fuel tank 105 into the canister 101.

The canister 101 and an intake pipe 201 are connected by a purge passage 103 connected at one end therefore to the purge port 301b of the canister 101. A purge valve 107 is provided within the purge passage 103. The purge valve 107 is an electromagnetic valve that places the canister 101 and the intake pipe 201 in communication with each other when electrified to switch to an "open" side. The purge passage 103 is also provided with an HC concentration sensor 114 that is a fuel vapor concentration sensor for detecting the HC concentration in the passage.

An atmospheric passage 104 is connected at one end thereof to the atmospheric port 301c of the canister 101, and is opened to the atmosphere at an opposite end of the passage. A purge pump 108 (described in detail below) is provided within the atmospheric passage 104. The purge pump 108 has a pump body 1081 and an electric motor 7 as a power source. The purge pump 108 supplies atmospheric air into the canister 101. The motor 7 may be, for example, a low-cost direct-current brush motor.

An ECU 112 is provided as a controller for controlling various portions of the fuel vapor handling apparatus 1. The ECU 112 is formed mainly by, for example, a microcomputer and the like. The ECU 112 accepts inputs of detection signals from the thermocouple 113 and the HC concentration sensor 114 as well as a level gauge 115 that is provided in the fuel tank 105 for detecting the level of the liquid surface FS of fuel F, that is, the amount of fuel. On the basis of these detection signals, the ECU 112 controls the purge valve 107, the purge pump 108 and the heater 109. The control of the purge pump 108 and the heater 109 is accomplished by outputting drive signals to an electric motor power source 110 and to an electric heater power source 111. As for the motor power source 110, the electrification of the electric motor 7 is on-off-controlled based on drive signals from the ECU 112. As for the heater power source 111, the electrification of the heater 109 is on-off-controlled based on drive signals from the ECU 112.

The ECU 112 controls not only the fuel vapor handling apparatus 1 but also other portions, for example, a throttle valve 202 provided in the intake pipe 201. That is, the ECU 112 controls operations of the entire internal combustion engine.

Figure 2:
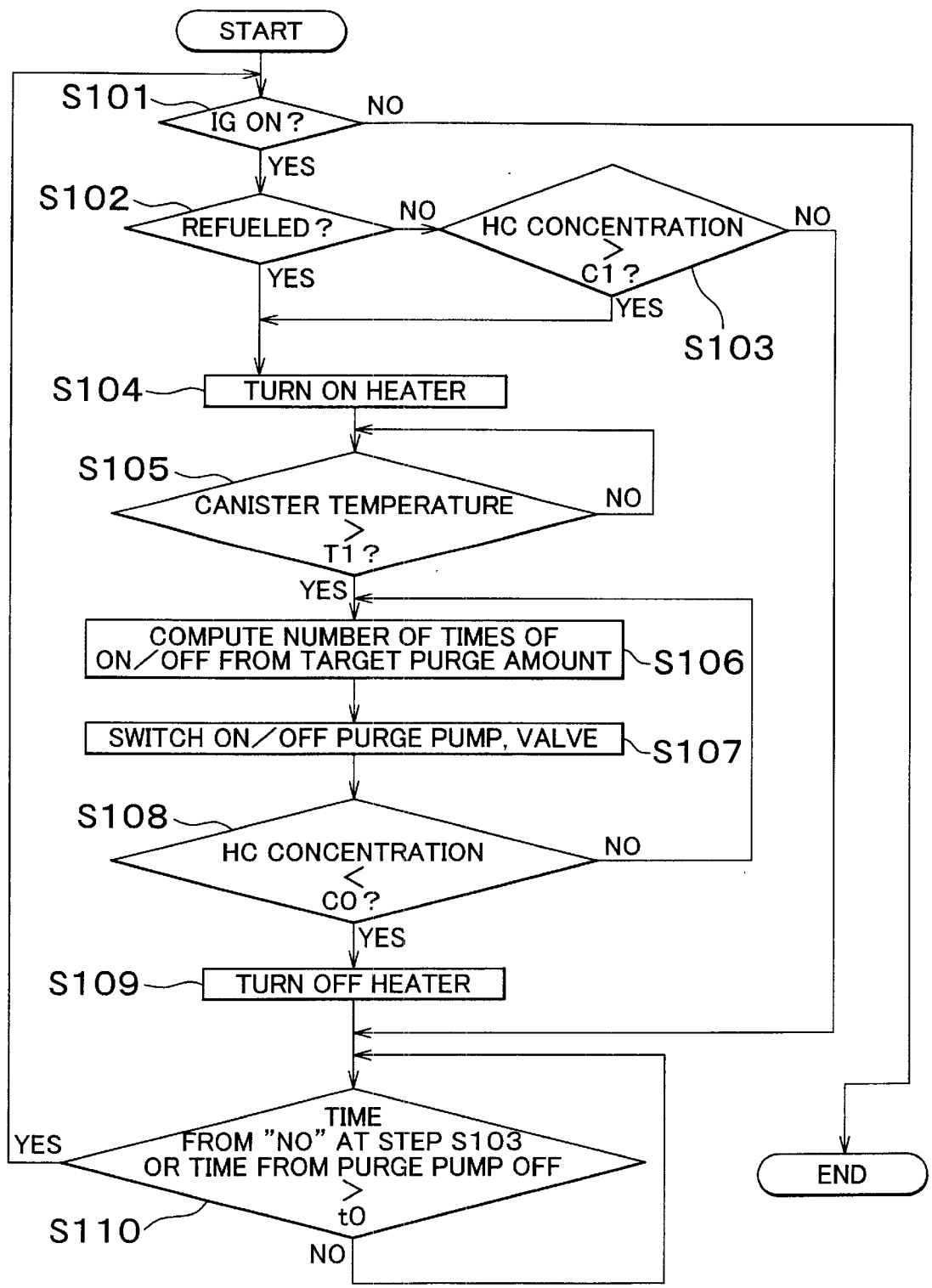
FIG. 2 is a flowchart illustrating the content of a control executed by an ECU of the fuel vapor handling apparatus shown in FIG. 1.

FIG. 2 is a flow chart of a fuel vapor purge control executed by the ECU 112. First, it is determined whether the ignition switch is turned on (step S101). If the determination is affirmative, the operation proceeds to step S102, in which a forcible purge procedure is started. If the ignition is not turned on, this operation ends.

In step S102, it is determined whether refueling is performed based on a detection signal from the level gauge 115. This determination is based on whether the level of the liquid surface FS of fuel F in the fuel tank 105 detected from the detection signal from the level gauge 115 has increased from the level detected during the previous execution of this procedure. In order to avoid a false determination due to a transient level rise, data of the level that remains unchanged for at least a set time period is used for the determination. The data of the previous level of the liquid surface FS is stored in a predetermined region of a RAM. The ECU 112 is designed so as to retain the previous level data of the liquid surface FS even during a stopped state of the internal combustion engine based on an energy saving operation mode, such as a sleep mode, a battery backup mode, etc. The previous level data is updated to the present level of liquid surface every time this flow is started.

If the determination at step S102 is affirmative, a forced purge procedure starting at step S104 is executed.

Conversely, if refueling is not performed and therefore the determination at step S102 is negative, the process proceeds to step S103, in which it is determined whether the HC concentration determined based on the HC concentration sensor 114 is greater than a purge starting concentration C1. The purge starting concentration C1 is set at a concentration at which the presence of need for a purge is recognized. It is advisable to empirically determine the purge starting concentration C1 beforehand.

If the determination at step S103 is affirmative, the forced purge procedure (starting at step S104) is executed. The operation that follows the negative determination at step S103 will be described below.

In the forced purge procedure starting at step S104, the heater 109 is turned on (step S104) to heat the interior of the canister 101. This facilitates desorption of fuel from the absorbent 302. Subsequently, it is determined whether the temperature in the canister 101 is greater than a pre-set purge starting temperature T1 based on the detection signal from the thermocouple 113 (step S105).

As the temperature in the canister 101 rises due to heat from the heater 109, an affirmative determination is made at step S105. Then, the number of cycles that prescribes the content of a control signal of the electric motor 7 of the purge pump 108 is computed (step S106). The control signal of the motor 7 is output in the fashion of pulses having equal cycles and equal pulse widths. The motor 7 is electrified only during the pulse output period. The number of cycles equals the number of pulses. That is, the motor 7 is electrified intermittently the number of times equal to the number of cycles. A procedure of computing the number of cycles will be described below. Subsequently in step S107, a control signal corresponding to the computed number of cycles is output to the motor power source 110. Synchronously with this control signal, a control signal is output to the purge valve 107, so that the purge valve 107 and the purge pump 108 synchronously intermittently operate.

Figure 3:
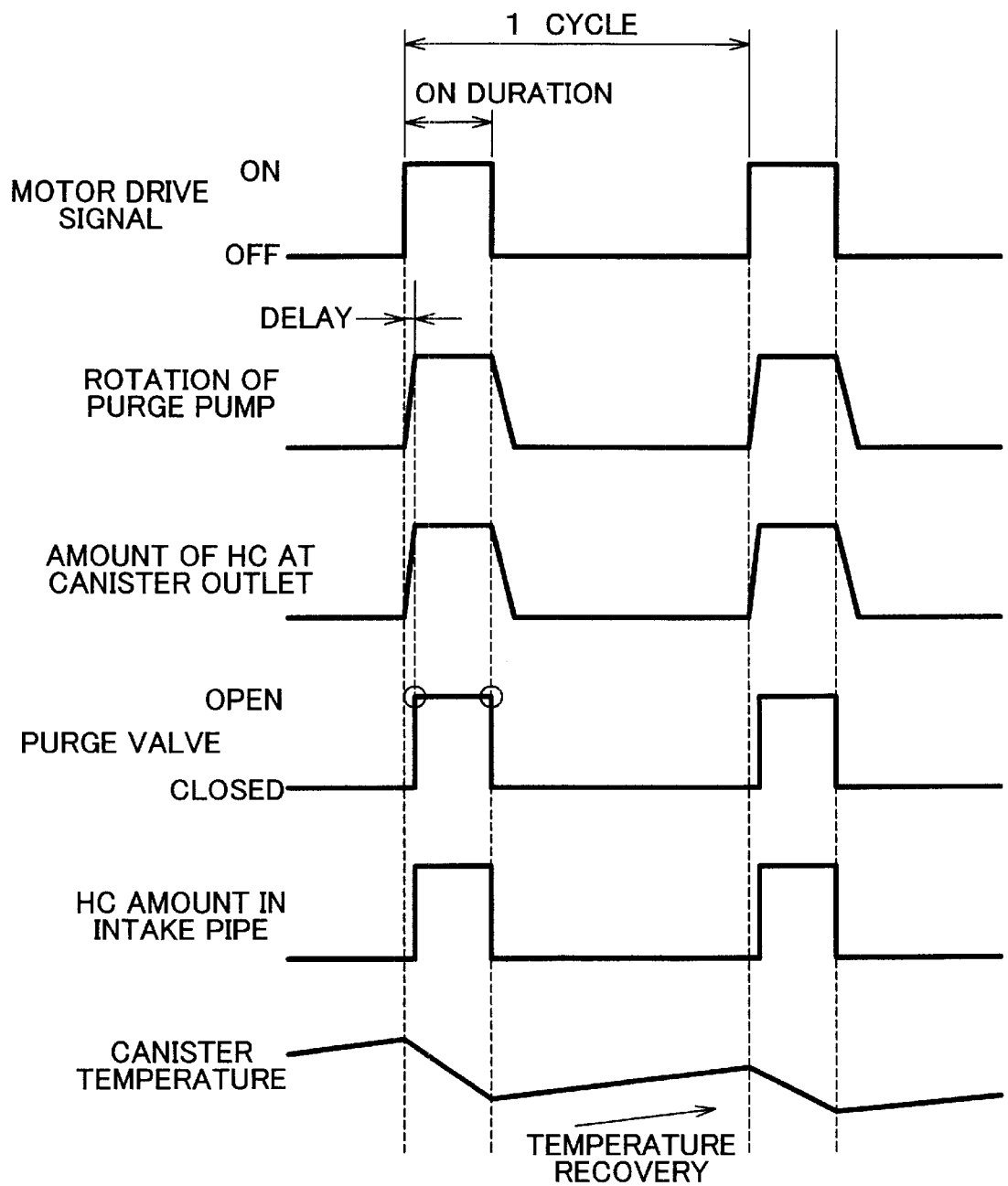
FIG. 3 is a timing chart indicating operations of various portions during a forced purge performed by the fuel vapor handling apparatus.

FIG. 3 indicates states of operation of various portions of the fuel vapor handling apparatus 1 during intermittent operations of the purge valve 107 and the purge pump 108. With respect to the ON period of the motor drive signal, that is, the period during which a voltage is applied to the motor 7, the open period (ON period) of the purge valve 107 has a set delay time. That is, the rising timing of the open period of the purge valve 107 is slightly later than the rising timing of the motor drive signal. The falling timing of the ON period of the motor drive signal is the same as the falling timing of the open period of the purge valve 107. Therefore, the period during which fuel is discharged from the canister 101 to the intake pipe 201 is determined by the open period of the purge valve 107.

The delay time is set as follows. As can be understood from FIG. 3, actual rotation of the purge pump 108 exhibits a delay time due to a starting delay of the motor 7 before a predetermined rotational speed is reached in response to the rise of the motor drive signal. The rotation of the purge pump 108 determines the amount of flow or air that flows in the canister 101. Therefore, a delay occurs before the amount of flow of air that includes desorbed fuel at the purge port 301b of the canister 101 (hereinafter, referred to as "purge amount of flow") reaches a predetermined amount of flow. The delay time is set approximately at this delay. It is advisable that the magnitude of the delay be empirically determined beforehand. The time needed for desorbed fuel to move from the canister 101 to the purge valve 107 is a conveyance delay. It is also appropriate to add the conveyance delay to the aforementioned delay time depending on the length of the purge passage 103 or the like.

Furthermore, the purge valve 107 is closed simultaneously with the fall of the motor drive signal. Therefore, the purge of fuel to the intake pipe 201 after the turning off of the motor drive signal is prohibited although the amount of flow of fuel at the purge port 301b of the canister 101 gradually decreases due to inertial operation of the purge pump 108.

Due to the setting of the start and end of operation of the purge valve 107 and the purge pump 108 in the above-described manner, the amount of flow of fuel purged to the intake pipe 201 via the purge passage 103 remains constant during the period of purge, and the amount of purge per cycle is accurately proportional to the length of the open duration of the purge valve 107. Therefore, the total amount of fuel purged by execution of step S107 is proportional to the length of time obtained by multiplying the length of the ON period of the purge valve 107 by the number of cycles (hereinafter, referred to "necessary ON time").

A procedure of computing the number of cycles (step S106) is performed in the following manner. A correspondence relationship between the necessary ON time and the target amount of purge is stored in the ROM of the ECU 112. The target amount of purge is set based on the amount of purge that is allowed based on the state of operation of the internal combustion engine. The necessary ON time corresponding to the target amount of purge is divided by the length of the ON period of the purge valve 107, thereby determining the number of cycles. Hence, an amount of purge suitable to the state of operation of the internal combustion engine is set. If it is appropriate that the target amount of purge be constant based on required specifications, the number of cycles is a fixed value.

Therefore, the precision in adjusting the amount of purge fuel that forms a portion of the mixture improves, so that the amount of fuel supplied to the cylinders can be controlled with high precision.

During the purge period during which air flows through the canister 101 and fuel desorbs from the absorbent 302, the temperature in the canister 101 decreases due to latent heat of vaporization as indicated in FIG. 3. However, since fuel is purged intermittently as described above, the temperature in the canister 101 increases during the non-purge periods due to heat transfer from the atmosphere around the canister 101 and heat from the heater 109. Thus, a state is achieved where desorption of fuel from the absorbent 302 is easily resumed. Therefore, the fuel purge efficiency improves. Furthermore, owing to the non-operation periods between actual operation periods of the purge pump 108, the service life of the motor 7 is extended. Furthermore, great capability of the heater 109 is not needed, so that these components may be of small sizes with reduced electric power consumption. Still further, due to the desorption accelerating effect of the heater 109, the cumulative amount of actual operation times of the motor 7 can be considerably reduced. Therefore, it becomes possible to adopt a simple brush motor or the like as a drive power source of the purge pump 108, as described below.

After the predetermined number of cycles of intermittent operations of the purge valve 107 and the purge pump 108, it is determined whether the HC concentration is less than a purge completing concentration C0 based on the detection signal from the HC concentration sensor 114 (step S108). The purge completing concentration C0 is set at a value that allows assumption of substantial completion of desorption of fuel from the absorbent 302.

While the HC concentration is above the purge completing concentration C0, that is, while fuel to be purged remains in the canister 101, the determination at step S108 is negative, and the process of step S106 to S108 is repeated.

When the HC concentration drops to the purge completing concentration C0 and an affirmative determination is made in step S108, the process proceeds to step S109, in which the heater 109 is turned off.

As described above, the need for forced purge is determined based on the HC concentration and based on whether refueling is performed or not. Therefore, the forced purge is performed during a predetermined period only when necessary. Hence, fuel purge can be efficiently performed.

Furthermore, the forced purge ends when the HC concentration becomes sufficiently low. Therefore, the forced purge is performed only during a needed period regardless of the temperature of the installation atmosphere of the canister 101 or the property of fuel. Therefore, the purge efficiency further improves.

Subsequently in step S110, it is determined whether the elapsed time following the turning off of the purge pump 108 has reached a waiting time t0. In step S110, determination is also made with regard to other elapsed times, which will be described below. The time following the turning off of the purge pump 108 is counted based on a timer that starts at the last turning off during the on-off operation of the purge valve 107 and the purge pump 108 (step S107). Until the HC concentration reaches the purge completing concentration C0 (step S108), the turning on/off operation of the purge valve 107 and the purge pump 108 (step S107) is repeated. The timer is reset every time the purge valve 107 and the purge pump 108 are turned off at every operation.

When the elapsed time following the turning off of the purge pump 108 reaches the waiting time t0 and an affirmative determination is made at step S110, the process returns to step S101, so that the procedure starting at step S101 is repeated. If in this case, it was determined in step 102 in the previous cycle that refueling is performed, the determination at step S102 during the present cycle becomes negative, and the process proceeds to step S103. If the HC concentration is above the purge starting concentration C1, the forced purge is performed (the process starting at step S104).

Therefore, the fuel that vaporizes in the fuel tank 105 and adsorbs to the absorbent 302 of the canister 101 during the waiting time t0 is purged. The waiting time t0 is set at a time that can be used as an index as to whether the HC concentration as a result of adsorption of a certain amount of HC to the absorbent 302 exceeds the purge starting concentration C1 along with progress of vaporization of fuel. It is advisable to empirically determine the waiting time t0 beforehand.

The case where the determination at S103 is negative will be described. The negative determination at step S103 occurs in various cases, including a case where the HC concentration has not reached the purge starting concentration C1 following the turning on of the ignition switch, a case where the forced purge (process starting at step S104) is performed, etc. In any case, at the elapse of a certain time following the determination, vaporization of fuel in the fuel tank 105 during the elapsed time causes adsorption of a certain amount of fuel to the absorbent 302 of the canister 101, and therefore can cause a certain rise in the HC concentration. Therefore, the negative determination at step S103 is followed by step S110, in which it is determined whether the elapsed time following the negative determination at step S103 has exceeded the waiting time t0. If an affirmative determination is made at step S1110, the process returns to step S101 as in the case where the elapsed time following the turning off of the purge pump 108 reaches the waiting time t0.

Figure 4:
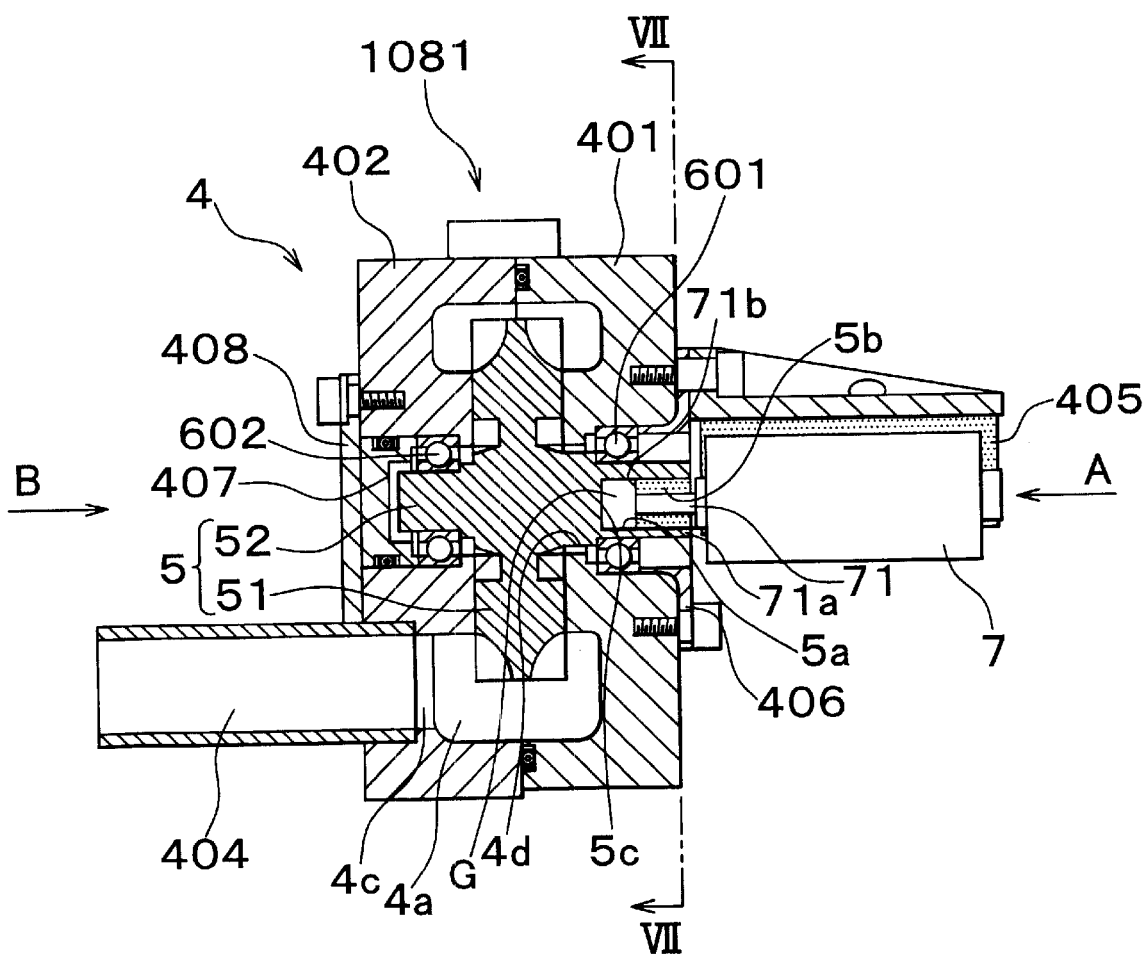
FIG. 4 is a sectional view of a purge pump of the fuel vapor handling apparatus.
Figure 5A:
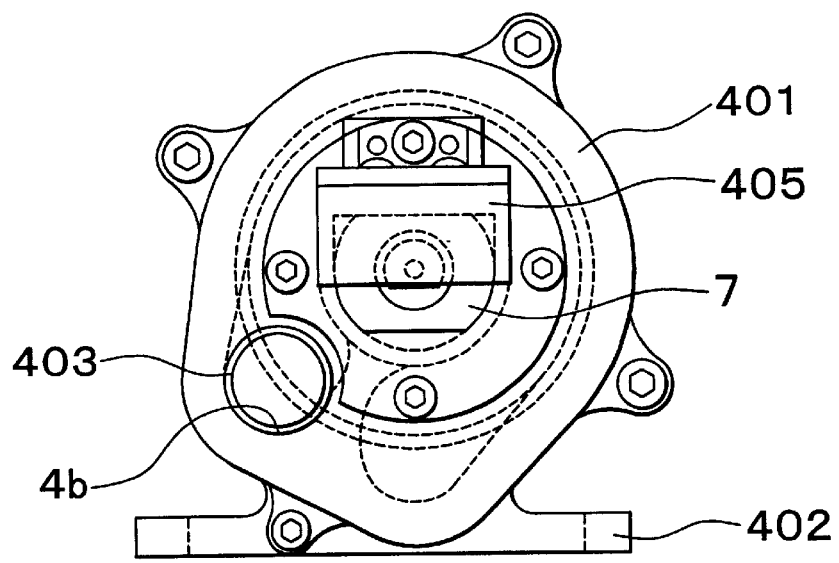
FIG. 5A is a view taken in a direction indicated by an arrow A in FIG. 4.
Figure 5B:
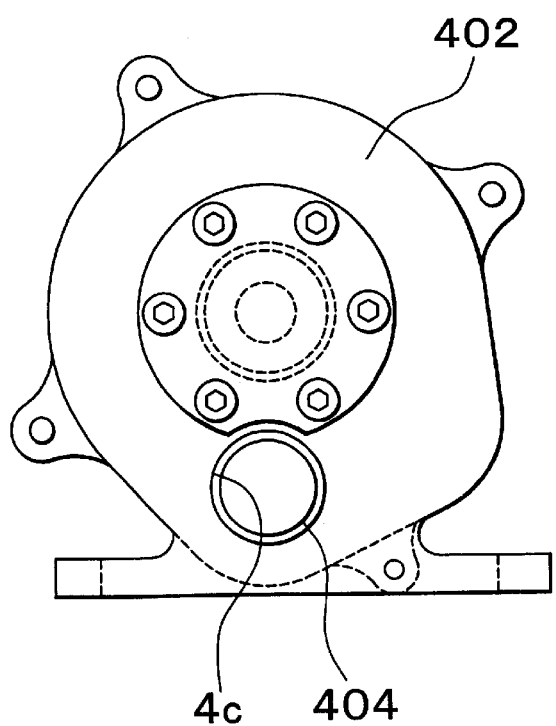
FIG. 5B is a view taken in a direction indicated by an arrow B in FIG. 4.

The structure of the purge pump 108 will be described with reference to FIGS. 4, 5 and 6. A pump body 1081 is of a circumferential flow type. A housing 4 of the pump body 1081 is formed by joining two generally circular housing members 401, 402. Therefore, a circular shape 4a that houses a disc-like body 51 of an impellor 5 is formed at a site where the housing members 401, 402 face each other. The housing 4 has holes 4b, 4c, 4d that extend in the directions of junction between the housing members 401, 402 at positions on a peripheral edge portion of the space 4a and a position on a center of the space 4a.

The holes 4b, 4c extending in the peripheral edge portion of the space 4a are formed at positions that are slightly shifted from each other in a circumferential direction. The hole 4b extends through the housing member 401, and the hole 4c extends through the housing member 402. A piping is fitted into the hole 4b so as to serve as an inlet 403 for introducing atmospheric air. Another piping is fitted into the hole 4c so as to serve as an outlet 404 for ejecting air. The outlet 404 is placed in communication to the atmospheric port 301c of the canister 101.

The hole 4d extending through the center of the space 4a extends through the two housing members 401, 402. A shaft portion 52 of the impellor 5 that extends through the impellor body 51 is inserted in the hole 4d. Bearings 601, 602 are provided around an outer periphery of the impellor shaft portion 52, coaxially therewith. The bearings 601, 602 are provided at positions across the impellor body 51 so as to curb displacement of the impellor 5 in the thrust directions and thereby prevent interference between the impellor 5 and the housing 4. The bearings 601, 602 are fixed by lid members 406, 407, 408 that substantially close the hole 4d.

The electric motor 7 is disposed at an end of the shaft of the impellor 5, and is fixed to a mounting stay 405 that is provided integrally with the housing member 401. The shaft portion 52 of the impellor 5 has a bottomed longitudinal hole 5a that extends along the axis from the motor 7-side end surface. A rotating shaft 71 of the motor 7 is fitted into the longitudinal hole 5a, so that the motor rotating shaft 71 is connected to the impellor 5.

Figure 6:
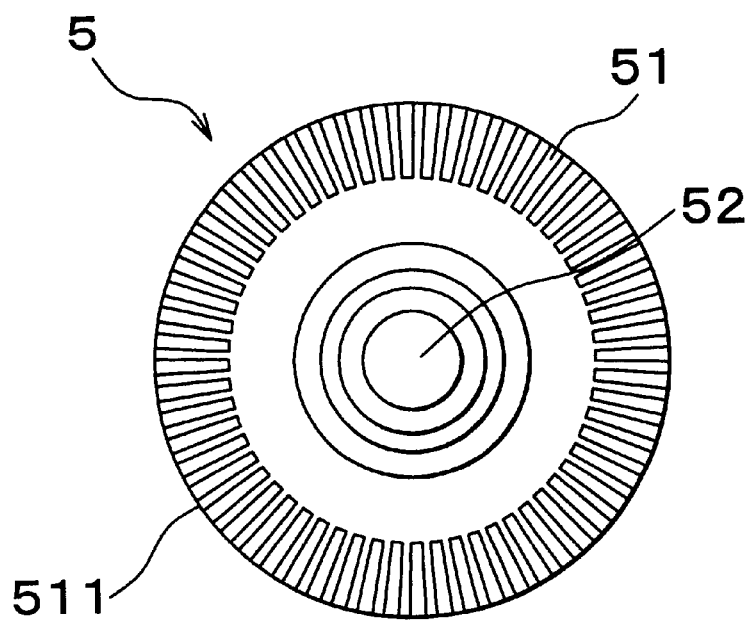
FIG. 6 is a view of an impellor of the purge pump taken in the direction indicated by the arrow B in FIG. 4.

Many vanes 511 are arranged circumferentially on two end surfaces of the impellor body 51 as shown in FIG. 6 (which shows only the housing member 402-side end surface). When the impellor 5 turns, turning currents occur around the outer periphery of the impellor shaft portion 52 along the two end surfaces of the impellor body 51, so that air from the inlet 403 is ejected from the outlet 404.

Figure 7:
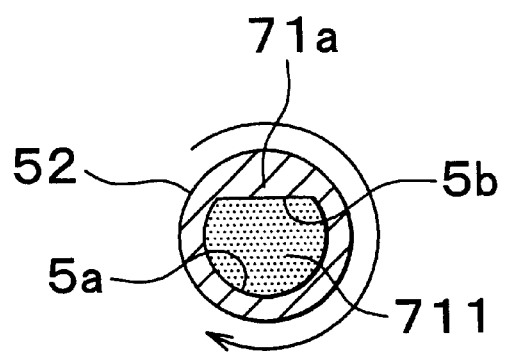
FIG. 7 is a sectional view of the impellor and a motor shaft connected thereto, taken on line VII—VII in FIG. 4.

In FIG. 7, which shows a connecting structure between the impellor 5 and the motor shaft 71, the longitudinal hole 5a of the shaft portion 52 of the impellor 5 and a shaft end portion 711 of the rotating shaft 71 of the motor 7 fitted therein (hereinafter, referred to as "motor shaft end portion 711") have a generally circular sectional shape, and more specifically, a "D" shape formed by linearly cutting out a portion of a circle. Thus, the sliding contact surfaces of the longitudinal hole 5a and the motor shaft end portion 711 have cut surfaces that serve as anti-slip portions 5b, 71a. In this manner, slipping of the impellor 5 relative to rotation of the motor rotating shaft 71 can be prevented. Thus, transfer of rotational power from the motor 7 to the impellor 5 is accomplished without provision of a fastening means.

The impellor shaft portion 52 and the motor shaft end portion 711 are slidable relative to each other in the thrust directions. A relatively great gap G is formed between a bottom surface 5c of the longitudinal hole 5a of the impellor 5 and an end surface 71b of the motor rotating shaft 71 that face each other. The impellor 5 is free to move with respect to the motor rotating shaft 71 in the thrust directions. Therefore, even if the position of the motor 7 deviates in the thrust direction, the play in the thrust direction due to the gap G avoids interference of the impellor 5 with the housing 4, thus preventing overload on the motor 7 or stoppage of rotation thereof.

Therefore, the loss of the purge pump 108 is reduced by reducing the clearance between the impellor 5 and the housing 4, and efficient purging can be realized.

The sectional shapes of the longitudinal hole of the impellor shaft portion and the motor shaft end portion are not limited to the shape shown in FIG. 7, but may be any shape as long as the contact surfaces of the impellor shaft portion and the motor shaft end portion have portions that are oblique to the direction of a circumference about the rotation center of the impellor and the motor so that the portions serve as a slip stopper for preventing slippage of the impellor relative to rotation of the motor shaft end portion. Examples of the sectional shape include an elliptical shape, a polygonal shape, etc. The connecting structure between the impellor shaft portion and the motor shaft end portion does not need to be a structure in which one of the two members is fitted into a hole formed in the other member, but is arbitrary.

SECOND EMBODIMENT

Figure 8:
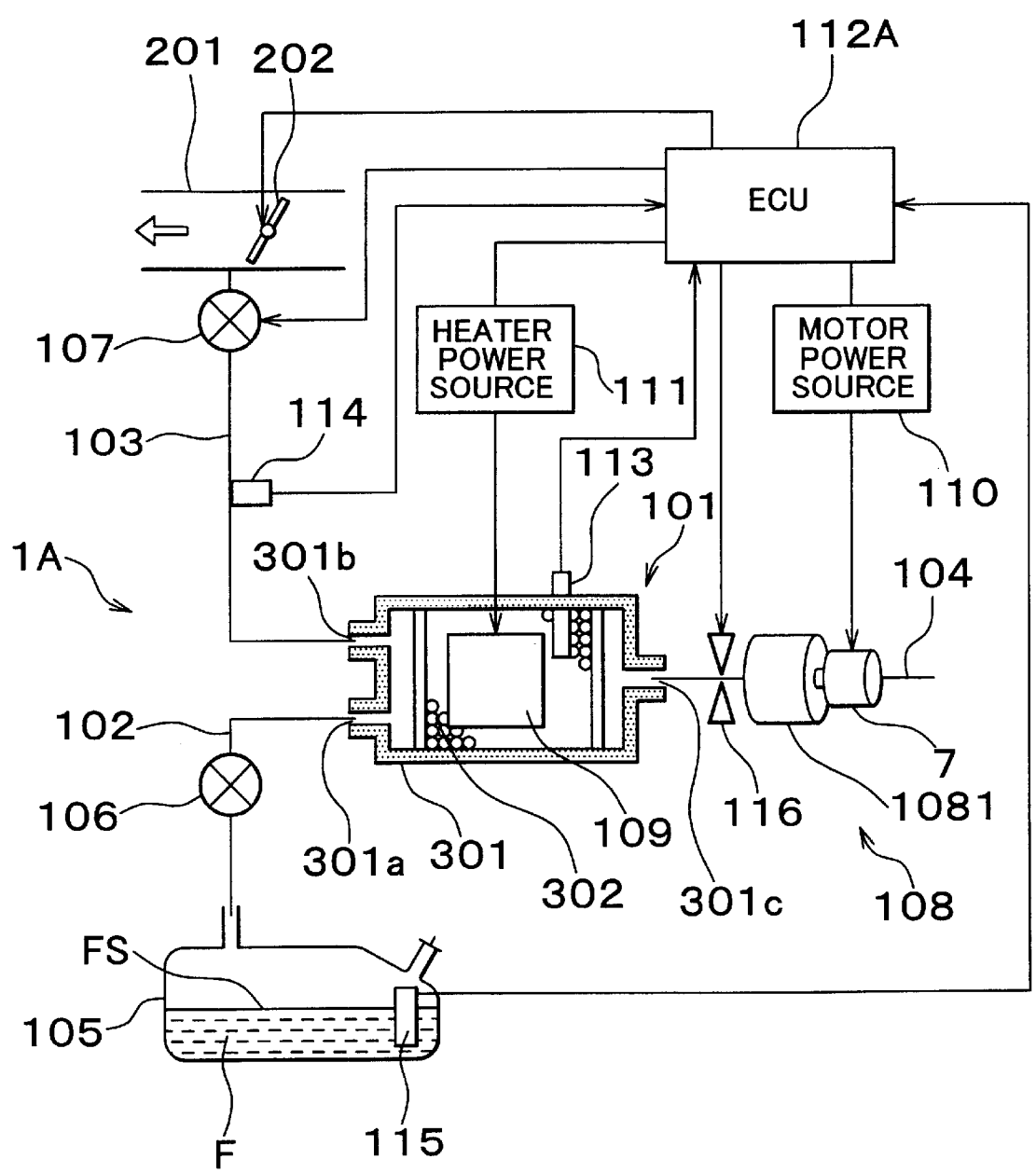
FIG. 8 is a diagram illustrating a construction of a second embodiment of a fuel vapor handling apparatus of the invention.

FIG. 8 shows a fuel vapor handling apparatus in accordance with a second embodiment of the invention. The construction of the second embodiment is basically the same as that of the first embodiment. Features distinguishing the second embodiment from the first embodiment will mainly be described below.

In a fuel vapor handling apparatus 1A of this embodiment, a pump valve 116 that serves as a metering valve is provided in an atmospheric passage 104 immediately downstream of a purge pump 108. The pump valve 116 is an electromagnetic valve designed so that the degree of opening of the valve is variable. The degree of opening of the valve is adjusted based on a control signal from an ECU 112A.

Figure 9:
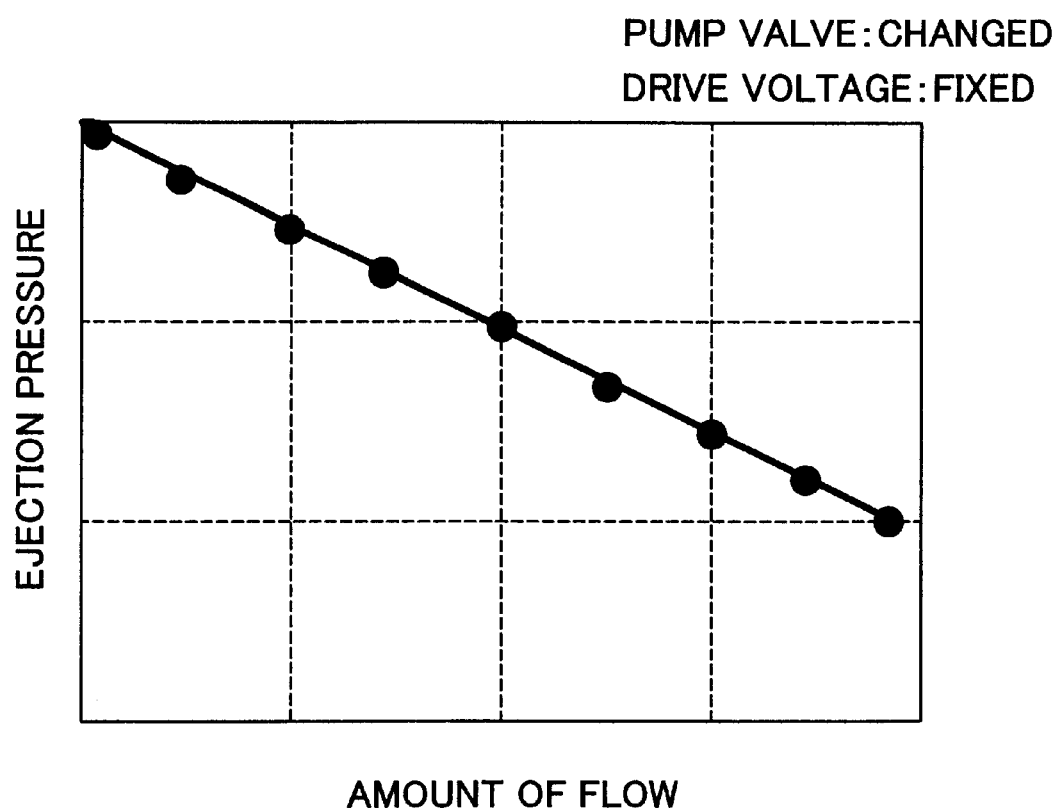
FIG. 9 is a graph indicating an operation of the fuel vapor handling apparatus.

FIG. 9 indicates a relationship between the ejection pressure of the purge pump 108 and the amount of flow ejected therefrom determined while the degree of opening of the pump valve 116 is changed. As the degree of valve opening is decreased, the ejection pressure increases and the amount of ejection flow decreases. In this embodiment, the ECU 112A adjusts the ejection pressure and the amount of ejection flow to values that are suitable to the target amount of purge by adjusting the degree of valve opening with respect to the target amount of purge.

Since the amount of purge can be adjusted without varying the voltage applied to the motor 7 or the like, the electric motor power source can be provided in a simple construction of constant voltage output type. Therefore, practicality improves.

Other controls executed by the ECU 112A are the same as those in the first embodiment.

Although the pump valve is provided at the ejection side of the purge pump, the pump valve may instead be provided on the suction side thereof.

THIRD EMBODIMENT

Figure 10:
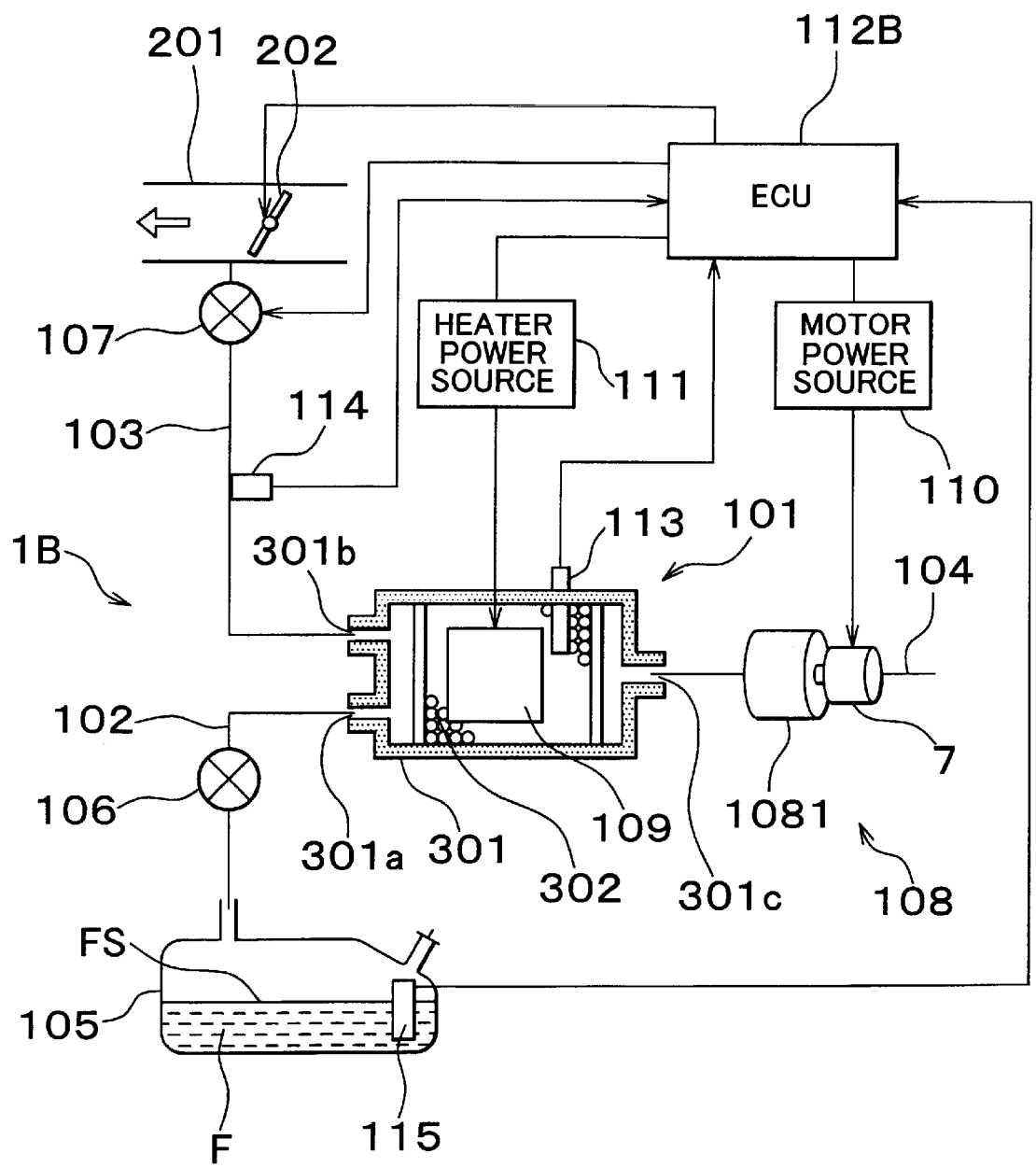
FIG. 10 is a diagram illustrating a construction of a third embodiment of a fuel vapor handling apparatus of the invention.

FIG. 10 shows a fuel vapor handling apparatus in accordance with a third embodiment of the invention. The construction of the third embodiment is basically the same as that of the first embodiment of the invention. Features distinguishing the third embodiment from the first embodiment will be mainly described below.

Figure 11:
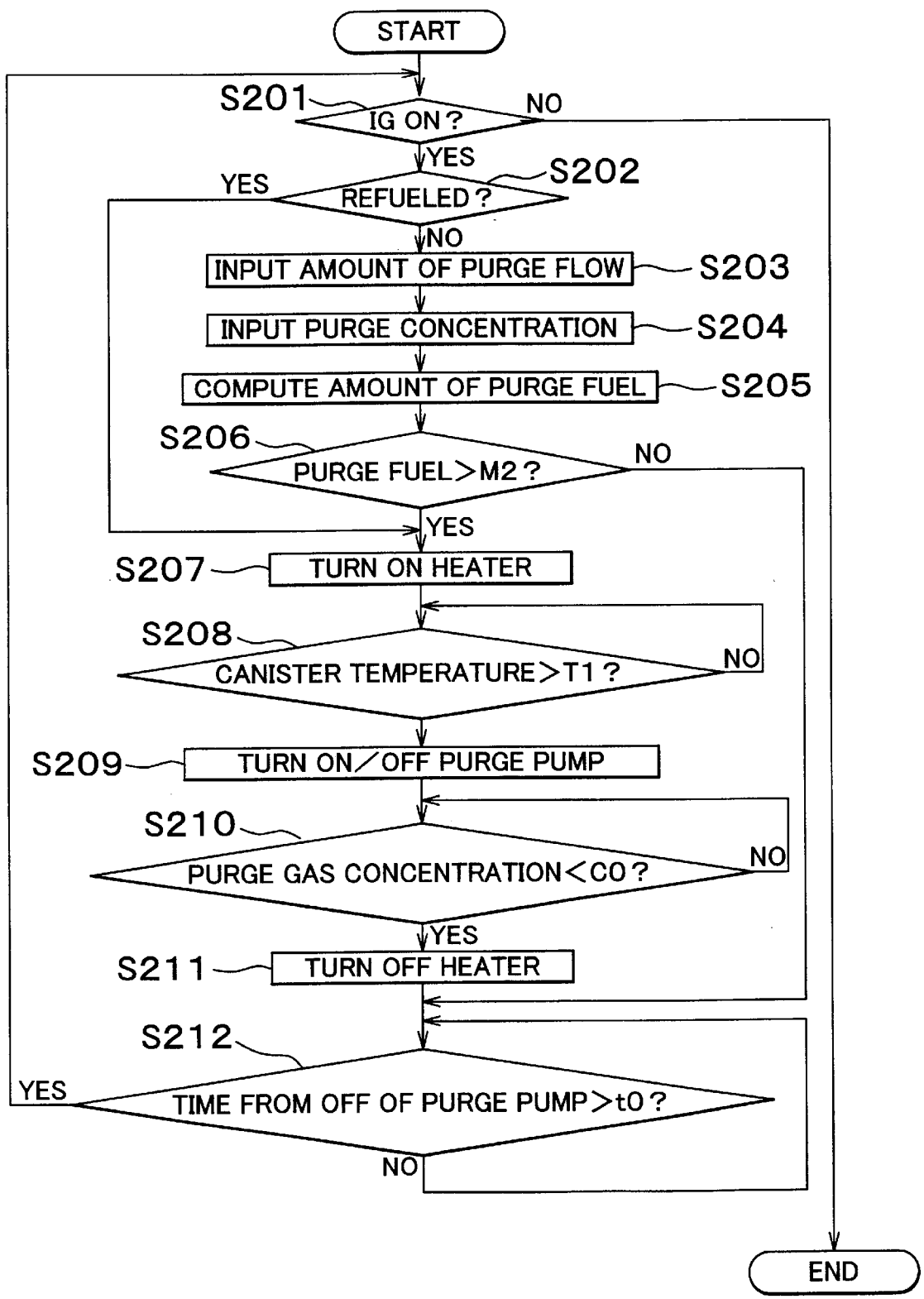
FIG. 11 is a flowchart illustrating the content of a control executed by the ECU of the fuel vapor handling apparatus.

An ECU 112B of a fuel vapor handling apparatus 1 of this embodiment executes control programs different from those of the first embodiment. FIG. 11 shows a flow of a fuel vapor purge control executed by the ECU 112B. After the ignition switch is turned on (step S201), it is determined whether refueling is performed (step S202). If refueling is not performed, the process proceeds to step S203, in which an amount of purge flow that is uniquely determined by the degree of purge valve opening is input. Subsequently in step S204, the HC concentration determined by the HC concentration sensor 114 is input. Subsequently in step S205, an amount of purge fuel is computed based on the amount of purge flow and the HC concentration. In step 206, it is determined whether the amount of ejection flow of fuel is greater than a predetermined value M2. The predetermined value M2 is set at an amount of fuel at which it is considered that purge is needed. It is advisable that the value be empirically determined beforehand. If the determination at step S206 is affirmative, a force purge procedure (starting at step S207) is executed. The case where the determination at step S206 is negative will be described below.

In the forced purge procedure starting at step S207, the heater 109 is turned on (step S207) to heat the interior of the canister 101. This facilitates desorption of fuel from the absorbent 302. Subsequently, it is determined whether the temperature in the canister 101 is greater than a pre-set purge starting temperature T1 based on the detection signal from the thermocouple 113 (step S208).

As the temperature in the canister 101 rises due to heat from the heater 109, an affirmative determination is made at step S208. The process then proceeds to step S209, in which the control signal of the electric motor 7 of the purge pump 108 is output in the fashion of pulses having equal cycles and equal pulse widths. The motor 7 is electrified only during the pulse output period. Synchronously with the control signal of the motor 7, a control signal is output to the purge valve 107, so that the purge valve 107 operates synchronously with the purge pump 108 as in the first embodiment. With respect to the ON period of the motor drive signal, that is, the period during which a voltage is applied to the motor 7, the open period (ON period) of the purge valve 107 has a set delay time. That is, the rising timing of the open period of the purge valve 107 is slightly later than the rising timing of the motor drive signal as is the case with the first embodiment. The amount of flow of fuel purged into the intake pipe 201 via the purge passage 103 is constant, and the amount of purge per cycle is accurately proportional to the length of open period of the purge valve 107.

Therefore, the precision in adjusting the amount of purge fuel that forms a portion of the mixture improves, so that the amount of fuel supplied to the cylinders can be controlled with high precision.

Furthermore, as in the first embodiment, the temperature in the canister 101 increases due to heat transfer from the atmosphere around the canister 101 and heat from the heater 109 during the non-purge periods of the intermittent operations of the purge valve 107 and the purge pump 108. Therefore, the fuel purge efficiency improves. Furthermore, owing to the non-operation periods between actual operation periods of the purge pump 108, the service life of the motor 7 is extended. Furthermore, great capability of the heater 109 is not needed, so that these components may be of small sizes with reduced electric power consumption.

After intermittent operations of the purge valve 107 and the purge pump 108 start as described above, it is determined whether the HC concentration is less than the purge completing concentration C0 based on the detection signal from the HC concentration sensor 114 (step S210). The purge completing concentration C0 is set at a value that allows an assumption that desorption of fuel from the absorbent 302 is substantially completed.

While the HC concentration is above the purge completing concentration C0, that is, while fuel to be purged remains in the canister 101, the determination at step S210 is negative, and the process of steps S209 to S210 is repeated. Since the amount of purge achieved by execution of step S209 is constant as mentioned above, the total amount of purge fuel is proportional to the length of time obtained by multiplying the length of the ON period of the purge valve 107 by the number of cycles.

When the HC concentration reaches the purge completing concentration C0 and an affirmative determination is made in step S210, the process proceeds to step S211, in which the purge pump 108 is turned off and the heater 109 is turned off. It should be apparent that the purge valve 107 is turned off as well.

As described above, the need for forced purge is determined based on the HC concentration and based on whether refueling is performed or not. Therefore, the forced purge is performed during a predetermined period only when necessary. Hence, fuel purge can be efficiently performed.

Furthermore, the forced purge ends when the HC concentration becomes sufficiently low. Therefore, the forced purge is performed only during a needed period regardless of the temperature of the installation atmosphere of the canister 101 or the property of fuel. Therefore, the purge efficiency further improves.

Subsequently in step S212, it is determined whether the elapsed time following the turning off of the purge pump 108 has reached a waiting time t0. The elapsed time following the turning off of the purge pump 108 is counted based on a timer that starts at the turning off of the pump 108.

When the elapsed time following the turning off of the purge pump 108 reaches the waiting time t0 and an affirmative determination is made at step S212, the process returns to step S201, so that the procedure starting at step S201 is repeated. If in this case, it is determined in step S202 in the previous cycle that refueling is performed, the determination at step S202 during the present cycle becomes negative, and the process proceeds to step S203. If the amount of purge fuel is greater than the purge start fuel amount M2, the forced purge is performed (the process starting at step S207).

Therefore, the fuel that vaporizes in the fuel tank 105 and adsorbs to the absorbent 302 of the canister 101 during the waiting time t0 is purged. The waiting time t0 is set at a time that can be used as an index for determination as to whether the HC concentration as a result of adsorption of a certain amount of HC to the absorbent 302 exceeds the purge starting fuel amount M2 along with progress of vaporization of fuel. It is advisable to empirically determine the waiting time t0 beforehand.

The case where the determination at S206 is negative will be described. The negative determination at step S206 occurs in various cases, including a case where the HC concentration has not reached the purge starting fuel amount M2 following the turning on of the ignition switch, a case where the forced purge (process starting at step S207) has been performed, etc. In any case, at the elapse of a certain time following the determination, vaporization of fuel in the fuel tank 105 during the elapsed time causes adsorption of a certain amount of fuel to the absorbent 302 of the canister 101, and therefore can cause a certain rise in the HC concentration. Therefore, the negative determination at step S206 is followed by step S212, in which it is determined whether the elapsed time following the negative determination at step S206 has exceeded the waiting time to. If an affirmative determination is made at step S212, the process returns to step S201 as in the case where the elapsed time following the turning off of the purge pump 108 reaches the waiting time t0.

FOURTH EMBODIMENT

Figure 12:
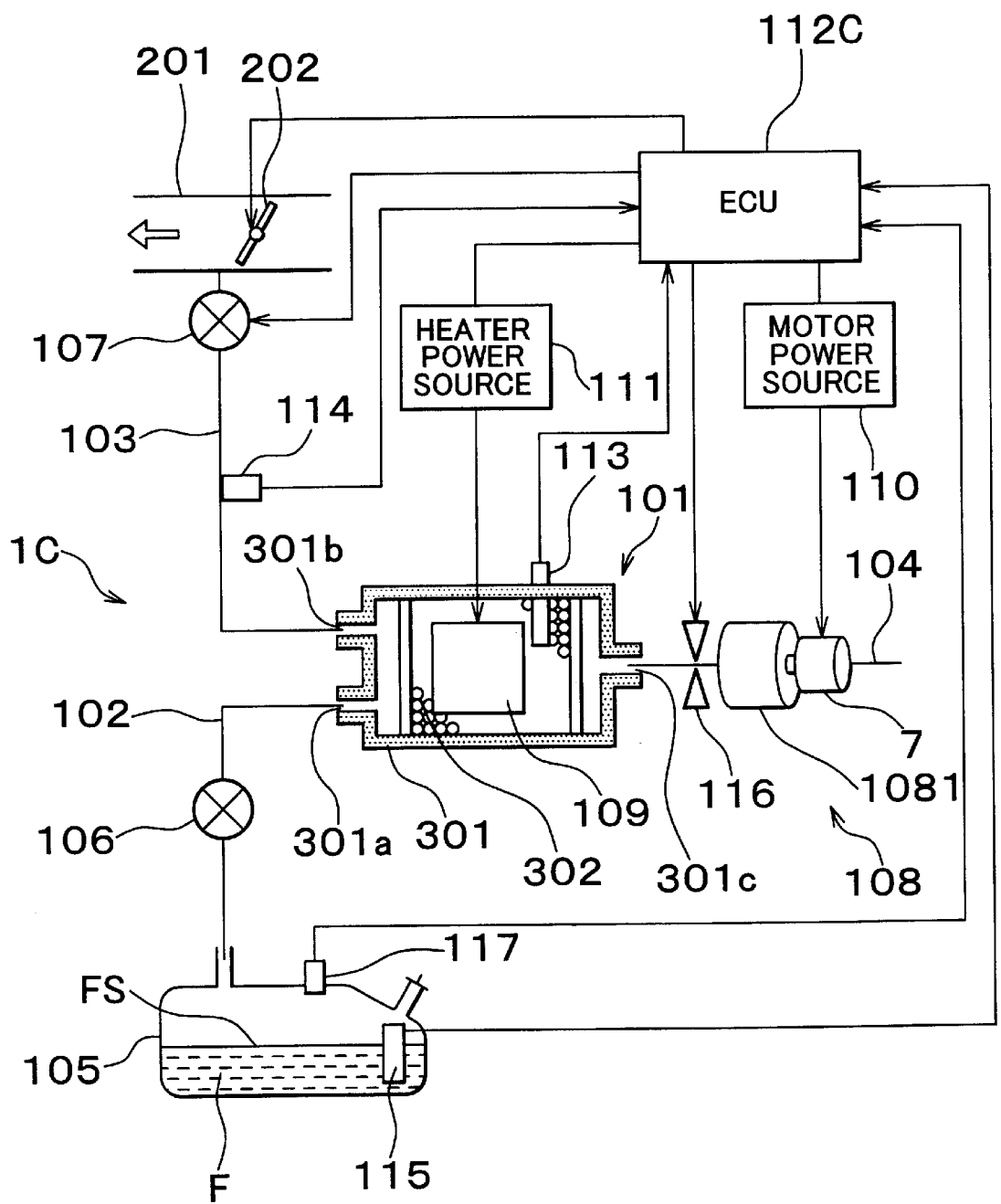
FIG. 12 is a diagram illustrating a construction of a fourth embodiment of a fuel vapor handling apparatus of the invention.

FIG. 12 shows a fuel vapor handling apparatus in accordance with a fourth embodiment of the invention. The construction of the fourth embodiment is basically the same as that of the second embodiment of the invention. Features distinguishing the fourth embodiment from the second embodiment will be mainly described below.

Figure 13:
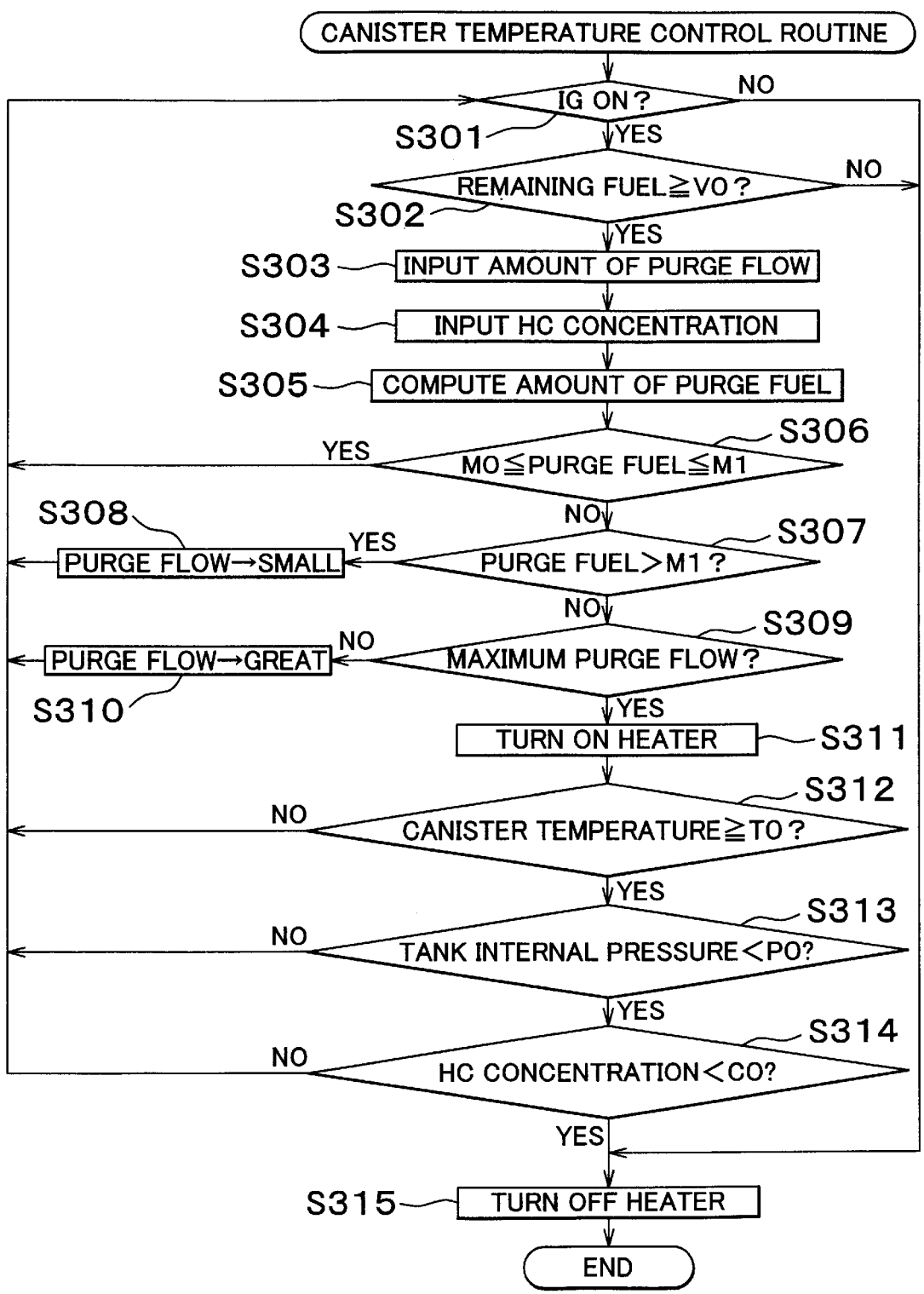
FIG. 13 is a flowchart illustrating the content of a control executed by the ECU of the fuel vapor handling apparatus.

In an fuel vapor handling apparatus 1C of this embodiment, a fuel tank 105 is provided with a pressure sensor 117 for detecting the pressure inside the fuel tank 105 (hereinafter, referred to as "tank internal pressure sensor"). A detection signal from the sensor is input to an ECU 112C. The ECU 112C executes control programs different from those of the second embodiment. FIG. 13 shows a flow of a fuel vapor purge control executed by the ECU 112C. After the ignition switch is turned on (step S301), it is determined whether the amount of fuel remaining in the fuel tank 105 is greater than or equal to a predetermined amount V0 based on a detection signal from the level gauge 115 (step S302). If the amount of fuel remaining is less than the predetermined amount V0, the control routine ends. Step S302 is executed in order to prevent adsorption of fuel to the absorbent 302 while the canister 101 is heated at the time of refueling. High temperature of the absorbent 302 is advantageous for desorption, but is disadvantageous for adsorption. Therefore, if it is determined that the amount of fuel remaining in the fuel tank 105 is small, the heating control of the absorbent 302 using the heater 109 is stopped. This will be described below.

If it is determined in step S302 that the amount of fuel remaining is greater than or equal to the predetermined amount V0, the process proceeds to step S303. In step S303, an amount of purge flow that is uniquely determined by the degree of opening of the purge valve 107 is input. Subsequently in step S304, the HC concentration determined by the HC concentration sensor 114 is input. Subsequently in step S305, an amount of purge fuel is computed based on the amount of purge flow and the HC concentration. In step S306, it is determined whether the amount of purge fuel is within a predetermined management range (M0≦amount of purge fuel≦M1). The management range means a range of amount of purge fuel that causes no combustion failure and no degraded exhaust emission when the at purge gas is introduced into the intake pipe 201.

If the amount of purge fuel is not within the management range in step S306, the process proceeds to step S307. In step 307, it is determined whether the amount of purge fuel that is outside the management range is greater than the upper limit value M1 of the management range. If the amount of purge fuel is greater than the upper limit value M1, the process proceeds to step S308, in which the amount of purge flow is reduced to reduce the amount of purge fuel. After that, the process returns to step S301.

If the amount of purge fuel is less than or equal to the upper limit value M1 in step S307, it is considered that the amount of purge fuel is less than the lower limit value M0, and the process proceeds to step S309. In step S309, it is determined whether the amount of purge flow is at a maximum, that is, whether the degree of opening of the metering valve 116 equals the upper limit value of an adjustable range of the valve. If the amount of purge flow is not at the maximum, the process proceeds to step S310, in which the amount of purge flow is increased to increase the amount of purge fuel. The process of steps S308 to S310 is a procedure by which the purge flow is adjusted by the ECU 112C.

If the amount of purge flow is at the maximum, it is considered that no more increase in the amount of purge fuel can be achieved at present. The process then proceeds to step S311, in which the heater 109 is turned on.

The amount of purge fuel introduced into the engine via the intake pipe 201 changes depending on the amount of purge flow that enters the intake pipe 201 as well as the HC concentration. Therefore, the amount of purge fuel is computed based on the HC concentration and the amount of purge flow in steps S303 to S305. Then, the operations of the purge pump 108 and the heater 109 are controlled (step S306 to S311) so that the amount of purge fuel is within the management range. In this process, the amount of purge flow is first adjusted. If this adjustment cannot achieve a predetermined amount of purge, then the heater 109 is started. Therefore, the amount of purge fuel can be controlled within the management range, so that fluctuations of the air-fuel ratio can be prevented and combustion failure and degraded exhaust emission can be prevented.

Subsequently in step S312, a result of detection by the thermocouple 113 is input, and it is determined whether the temperature of the absorbent 302 in the canister 101 is higher than or equal to a predetermined temperature T0. In this case, it is preferable that the predetermined temperature T0 be a temperature that allows complete desorption of fuel vapor in the canister 101, and normally is 100° C. If the temperature of adsorbent is below the predetermined temperature T0 in step S312, the process returns to step S301. If the temperature is higher than or equal to the predetermined temperature T0, the process proceeds to step S313. In step S313, a result of detection by the tank internal pressure sensor 117 that monitors the tank internal pressure is input, and it is determined whether the tank internal pressure is lower than a predetermined value P0 which is the valve opening pressure of the internal pressure valve 106 in this embodiment. If the tank internal pressure is higher than or equal to the predetermined value P0, it is considered that the internal pressure valve 106 is open and fuel vapor is entering the canister 101, and the process returns to step S301.

Conversely, if the tank internal pressure is lower than the predetermined value P0, it is considered that fuel vapor is not entering the canister 101, and the process proceeds to step S314. In step S314, it is determined whether the HC concentration monitored by the HC concentration sensor 114 is less than a predetermined concentration C0. If the HC concentration is higher than or equal to the predetermined concentration C0, it is considered that fuel still remains in the canister 101, and the process returns to step S301. If the HC concentration is less than the predetermined concentration C0, it is considered that no fuel remains in the canister 101, and the process proceeds to step S315. After the heater 109 is turned off in step S315, the control routine ends.

Steps S313 and S314 are provided for the purpose of reducing the electric power consumption. If the internal pressure of the fuel tank 105 is lower than the valve opening pressure and the HC concentration is less than the predetermined concentration C0, it is considered that there is no need for the heating by the heater 109, and the heater 109 is turned off to reduce the power consumption.

During a stoppage of the engine, the heater 109 is not on and there is no negative pressure in the intake pipe 201, so that only fuel vapor produced due to increases in the external air temperature is adsorbed to the canister 101. That is, as fuel vaporizes in the fuel tank 105 and the internal pressure in the fuel tank 105 rises above a predetermined value, the internal pressure valve 106 opens to discharge fuel vapor into the canister 101 via the fuel vapor introducing passage 102 and the tank port 301a. Since fuel has been substantially completely desorbed from the canister 101 due to a stoppage of the engine, the canister 101 is capable of sufficiently adsorbing fuel vapor from the fuel tank 105, and therefore efficiently adsorbs fuel vapor that flows in. Furthermore, since no fuel vapor remains in the canister 101, it is possible to prevent an event such as in the conventional art, in which fuel vapor remaining in the canister 101 diffuses and is let out into the atmosphere via an atmospheric opening during a stoppage of the engine.

At the time of refueling, the supplied fuel pushes fuel vapor residing in the fuel tank 105 so as to open a refuel valve. Therefore, fuel vapor flows from a refueling line into the canister 101 via the fuel vapor introducing passage 102. Prior to refueling, the heating by the heater 109 is stopped because high temperatures of the absorbent 302 reduce the adsorption capability. That is, in the control routine illustrated in FIG. 13, if it is determined that the remaining amount of fuel has become less than the predetermined amount VO, that is, refueling is needed (step S302), the heater 109 is turned off (step S315). The predetermined amount VO in step S302 is set at an amount that is slightly greater than a remaining amount of fuel that normally requires refueling, for example, at a quarter of the nominal capacity of the tank. Therefore, when the remaining amount of fuel becomes less than a quarter of the capacity, the heater 109 is turned off. Hence, by the time of refueling, the temperature in the canister 101 returns to substantially normal temperature. Thus, adsorption to the canister 101 during a state of high temperatures thereof, that is, high temperatures of the absorbent 302, can be avoided.

If refueling is performed while the remaining amount of fuel is greater than the predetermined amount VO or immediately after the remaining amount of fuel decreases to the predetermined amount VO, the heater 109 is turned off in response to a stoppage of the engine or at the time point when the remaining amount of fuel reaches the predetermined amount VO (steps S301, S302), that is, the heater 109 is electrified immediately before the refueling. In such a case, the temperature of the absorbent 302 still may be high due to a short time between the turning off of the heater 109 and the refueling. In that case, however, the amount of fuel supplied by refueling is relatively small and the amount of fuel vapor produced is proportional to the amount of fuel supplied. Therefore, the amount of fuel vapor that flows into the canister 101 is not very great. Furthermore, since desorption of fuel from the absorbent 302 of the canister 101 has been substantially completed, the canister 101 can adsorb the entire amount of fuel vapor. Taking the aforementioned factors into consideration, the remaining amount of fuel VO at which the heater 109 is turned off is set at an optimal value determined from the capacity of the absorbent 302 of the canister 101, the size of the fuel tank 105 and the amount of fuel vapor entering the canister 101, so that the absorbent 302 can adsorb the entire amount of fuel vapor that flows into the canister 101 at the time of refueling.

Although in this embodiment, the amount of purge flow is adjusted by the ECU 112C adjusting the degree of opening the pump valve 116, the amount of purge flow may instead be adjusted by adjusting the duty of the purge valve 107 or the drive voltage of the motor 7.

FIFTH EMBODIMENT

Figure 14:
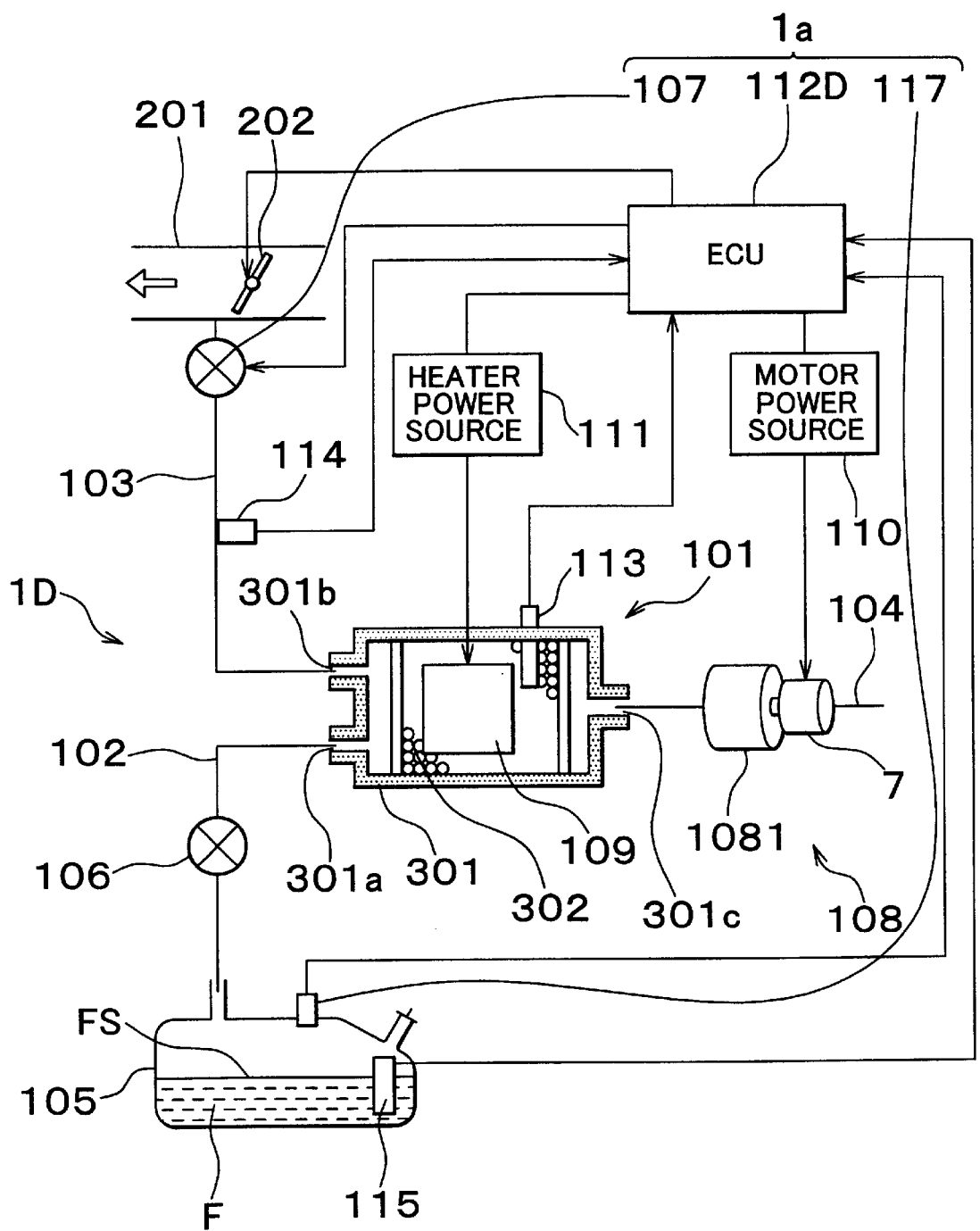
FIG. 14 is a diagram illustrating a fuel vapor handling apparatus equipped with a diagnostic apparatus in accordance with an aspect of the invention.

FIG. 14 shows a fuel vapor handling apparatus in accordance with a fifth embodiment of the invention. The construction of the fifth embodiment is basically the same as that of the first embodiment of the invention. Features distinguishing the fifth embodiment from the first embodiment will be mainly described below.

An ECU 112D of a fuel vapor handling apparatus ID of this embodiment performs detection of operation abnormalities of the purge pump 108, such as a failure of the motor 7 and the like, based on a detection signal from the tank internal pressure sensor 117, in addition to the forced purge as in the ECU of any one of the foregoing embodiments. Thus, the ECU 112D forms a diagnostic apparatus 1a, together with the purge valve 107 and the tank internal pressure sensor 117.

Figure 15:
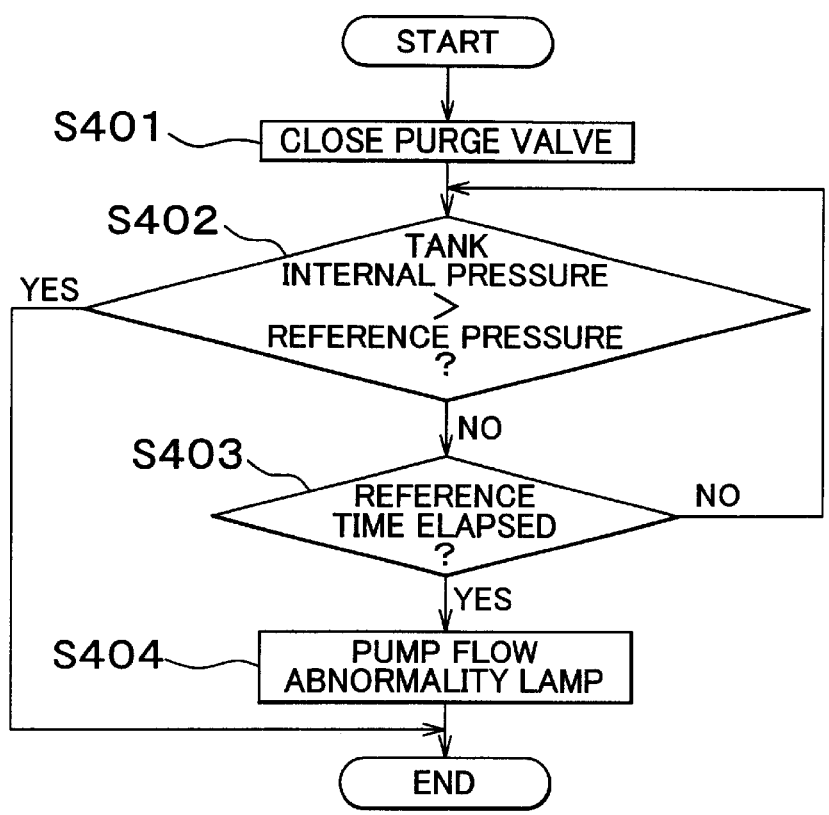
FIG. 15 is a flowchart illustrating the content of a control executed by the ECU of the fuel vapor handling apparatus.

FIG. 15 illustrates a flow of detecting an operation abnormality. After the purge pump 108 has been turned on, the purge valve 107 is closed (step S401) to form a closed space extending from the fuel tank 105 to the purge valve 107 via the canister 101.

When the purge valve 107 is closed, a timer is started. After the timer has been started, the tank internal pressure determined by the tank internal pressure sensor 117 is compared with a pre-set reference pressure so as to determine whether the tank internal pressure is greater than the reference pressure (step S402).

If the determination at step S402 is negative, the elapsed time following the formation of the closed space, which is obtained from the timer, is compared with a pre-set reference time to determine whether the reference time has elapsed (step S403).

If the determination at step S403 is negative, the process returns to step S402. Thus, the process of steps S402 and S403 is repeated until the tank internal pressure exceeds the reference pressure before the elapse of the reference time or until the elapsed time exceeds the reference time before the tank internal pressure exceeds the reference pressure.

Figure 16:
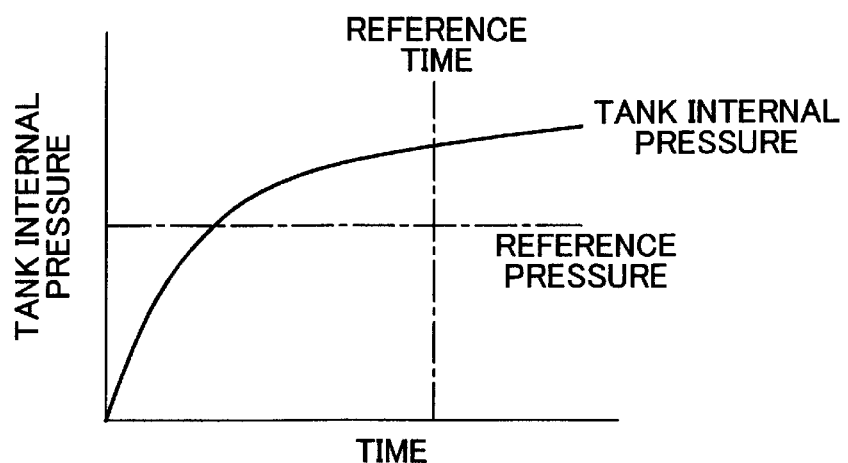
FIG. 16 is a graph indicating an operation of the diagnostic apparatus.

The reference pressure and the reference time are set as follows with reference to FIG. 16. That is, if the purge pump 108 is normal and is operating with a predetermined ejection pressure and a predetermined amount of ejection flow, the pressure in the closed space, that is, the tank internal pressure, rises at a predetermined rising rate. After a certain time elapses, the tank internal pressure reaches a certain pressure. If the purge pump 108 has an operation abnormality, the tank internal pressure rises at a low rising rate or remains at a constant value. Therefore, the reference time is determined beforehand by determining a time needed for the tank internal pressure to reach a predetermined pressure when the purge pump 108 is considered normal. The reference pressure, that is, the aforementioned predetermined pressure, is set at a pressure value that allows determination as to whether it is possible to output an ejection pressure needed for purging. It is advisable to set the values factoring in the time that is allowed as a time needed before a result is obtained regarding the determination as to whether the purge pump 108 has an abnormality, and the pressure value that is achievable in accordance with the capability of the purge pump 108 in the normal state.

If the tank internal pressure exceeds the reference pressure before the elapsed time reaches the reference time, it is determined that the purge pump 108 is normal, and this flow of operation is ended. If the elapsed time exceeds the reference time before the tank internal pressure exceeds the reference pressure, it is determined that the purge pump 108 is abnormal, and a pump flow abnormality lamp is turned on to indicate that the amount of pump flow is abnormal (step S404).

It should be apparent that the operation of the purge pump 108 in the aforementioned case can be a continuous operation instead of intermittent operations.

Although an abnormality is determined if the elapsed time exceeds the reference time before the tank internal pressure exceeds the reference pressure, it is also possible to determine whether the purge pump 108 is abnormal based on the tank internal pressure rising rate at a predetermined time point or the like.

Although in the foregoing embodiments, the purge pump is provided in the atmospheric passage, the purge pump may instead be provided in a purge passage at the canister side of the purge valve.

SIXTH EMBODIMENT

A sixth embodiment of the invention will be described below with reference to the drawings.

Figure 17:
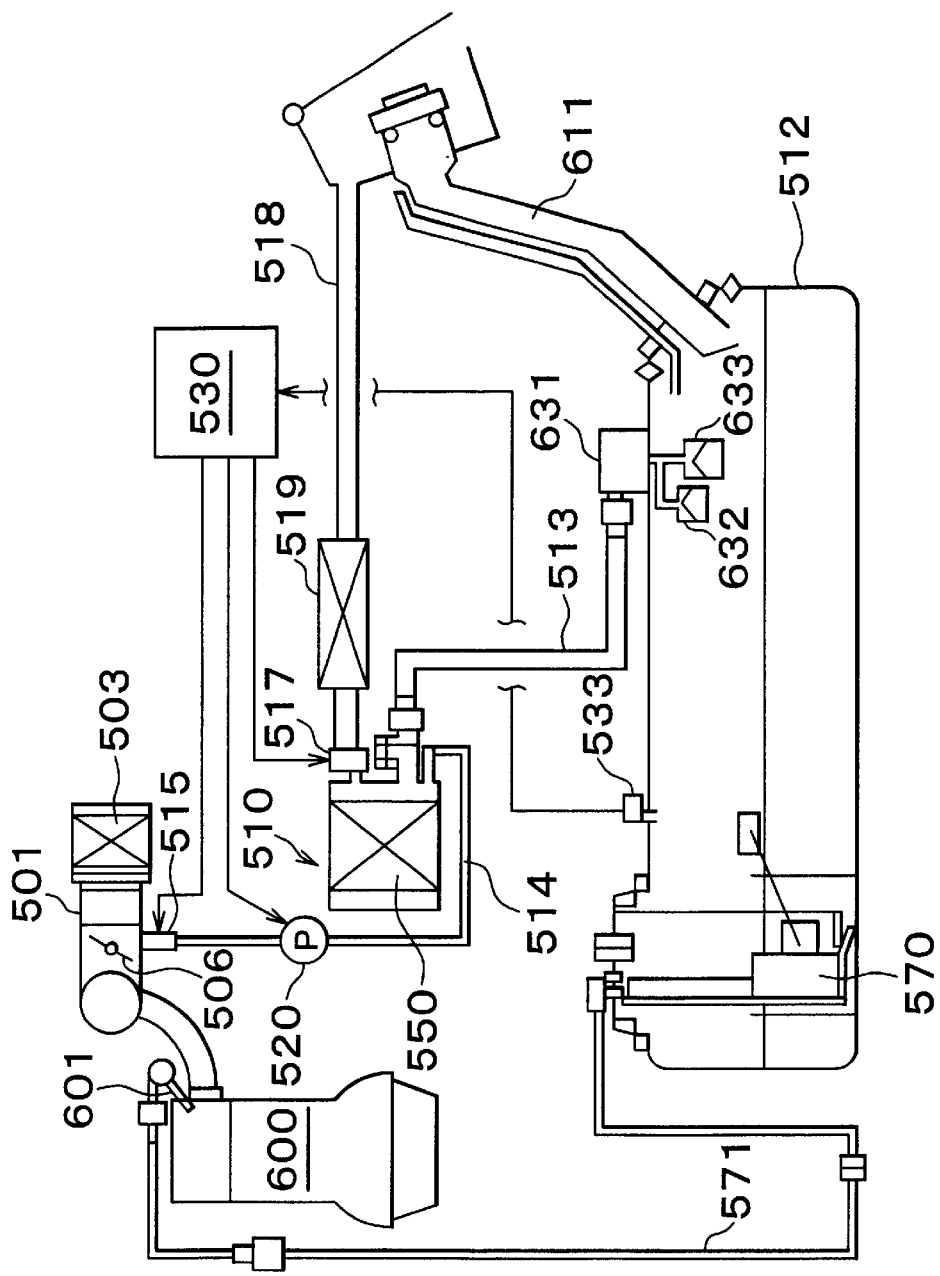
FIG. 17 is a diagram schematically illustrating a construction of an embodiment in which the invention is applied to a canister purge system of an automotive internal combustion engine.

FIG. 17 is a diagram schematically illustrating a construction of an embodiment in which the invention is applied to a purge system of an automotive internal combustion engine. In FIG. 17, reference numeral 600 represents an internal combustion engine body, and 501 represents an intake passage of the internal combustion engine 600, and 503 represents an air cleaner disposed in the intake passage 501. The intake passage 501 is provided with a throttle valve 506 that assumes a degree of opening in accordance with the operation of an accelerator pedal (not shown) performed by a driver. In this embodiment, the engine 600 is an engine capable of lean air-fuel ratio operation, and conducts combustion at a lean air-fuel ratio during a specific operation region.

When the intake passage 501 is in a lean air-fuel ratio operation, fuel is injected from a fuel injection valve 601 into a cylinder during the compression stroke so that a combustible air-fuel ratio mixture is stratified only in the vicinity of an ignition plug (not shown) in the cylinder, and the stratified mixture is ignited. Therefore, it becomes possible to achieve combustion at the ratio between the air and the fuel supplied into the cylinder (air-fuel ratio) which is much higher than the stoichiometric air-fuel ratio (i.e., considerably to the lean side). During a lean air-fuel ratio operation of the engine 600, the throttle valve 506 is set to a degree of opening that is nearly the fully open state, so that intake constriction loss is reduced. Therefore, during the lean air-fuel ratio operation, substantially no negative pressure occurs in the intake passage 501 downstream of the throttle valve 506.

In FIG. 17, reference numeral 512 represents a fuel tank of the engine. Fuel in the tank 512 is pressurized by a fuel pump 570, and is delivered thereby to the fuel injection valve 601 of each cylinder of the engine 600 via a feed piping 571.

The fuel tank 512 is provided with a refueling pipe 611 for refueling to the fuel tank 512. A breather piping 513 that is a vapor passage connecting a space above the fuel liquid surface in the fuel tank 512 to a canister 510 described below is connected to an upper portion of the fuel tank 512.

A connecting portion between the breather piping 513 and the fuel tank 512 is provided with a vent valve 631, and a COV (cut-off valve) 632 and a ROV (roll-over valve) 633 both of which are formed by float valves. The vent valve 631 opens to allow air containing fuel vapor from the fuel tank 512 to flow to the canister via the breather piping 513 when the internal pressure of the fuel tank 512 becomes slightly higher than the internal pressure of the breather piping 513.

The ROV 633 is closed to shut down the connection between the vent valve 631 and the fuel tank 512 in response to a rise of the fuel liquid surface at the time of refueling. The ROV 633 also closes the connecting portion between the vent valve 631 and the fuel tank 512 at the time of a vehicle rollover or the like, so as to prevent leakage of a great amount of fuel oil via the breather piping 513 to the outside.

The COV 632 is disposed in parallel to the ROV 633, and closes the communication between the vent valve 631 and the fuel tank 512 when the fuel liquid surface rises further above the ROV 633. During a rise of the fuel liquid surface at the time of refueling, the COV 632 is opened to place the fuel tank 512 and the vent valve 631 in communication with each other even after the ROV 633 closes. However, if the fuel liquid surface reaches the position of the COV 632 due to agitation of the liquid surface at the time of the cornering of the vehicle or the like, or if the vehicle rolls over, the COV 632 closes to prevent fuel from entering the breather piping 513 via the vent valve 631.

In FIG. 17, reference numeral 530 represents an electronic control unit (ECU) of the engine. The ECU 530 is formed by a microcomputer that has a known construction in which a ROM (read-only memory), a RAM (random access memory), a CPU (microprocessor) and input/output ports are interconnected by a bidirectional bus. The ECU 530 performs basic controls, including a fuel injection control and the like, and also performs a diagnostic operation for the purge system (described below) in this embodiment.

For the aforementioned controls, the output port of the ECU 530 is connected to the fuel injection valve 601 of the engine 600 via a drive circuit (not shown) so as to control the amount of fuel injected from the fuel injection valve 601, and is also connected to an actuator of a purge control valve 515 (described below) and an actuator of a CCV (canister closure valve) 517 so as to control the operations of the valves.

The input port of the ECU 530 accepts input of signals that indicate the engine revolution speed, the amount of intake air, the engine cooling water temperature, etc., from sensors (not shown), and also accepts input of a signal corresponding to the pressure in the space above the fuel liquid surface in the fuel tank 512 from a pressure sensor 533 provided on the fuel tank 512.

In FIG. 17, reference numeral 510 represents a canister that adsorbs fuel vapor from the fuel tank. The canister 510 is connected to the space above the fuel liquid surface in the fuel tank 512 via the breather piping 513, and to the intake passage 501 via a purge piping 514 provided as a purge passage. In FIG. 17, reference numeral 515 represents a purge control valve disposed in a connecting portion between the purge piping 514 and the intake passage 501. The purge control valve 515 is provided with an actuator of a suitable type, such as a solenoid actuator or the like. The purge control valve 515 is opened in response to a signal from the ECU 530 so as to place the canister 510 and the intake passage 501 in communication with each other.

The canister 510 is formed by a container that contains a fuel vapor adsorbent 550 such as activated carbon or the like. The breather piping 513, the purge piping 514 and an atmosphere connecting pipe 518 are connected to the canister 510.

Another end of the atmosphere connecting pipe 518 is open to the vicinity of a fuel inlet of the fuel tank 512. The CCV 517 and an air filter 519 are provided on the atmosphere connecting pipe 518. The air filter 519 removes foreign substances from air that flows into the canister 510 via the atmosphere connecting pipe 518 during execution of a purge. The CCV 517 is provided with an actuator of a suitable type, such as a solenoid actuator or the like, and shuts down the communication between the atmosphere connecting pipe 518 and the canister 510.

A purge pump 520 is provided on the purge piping 514.

The purge pump 520 is a type of pump that reverses the directions of intake and ejection depending on the rotational direction as in, for example, a turbine pump (so-called turbo pump) or the like.

In this embodiment, the purge pump 520 is provided with a drive power source (not shown) that operates independently of the operation of the engine, such as an electric motor or the like, and therefore can be operated even after the engine stops. The drive power source of the purge pump 520 is of a type capable of reverse operation. That is, the operational or rotational direction of the purge pump 520 can be changed between the forward direction (such a direction as to deliver gas from the canister 510 side to the purge control valve 515 side) and the reverse direction (such a direction as to deliver gas from the purge control valve 515 side to the canister 510 side).

Next described will be a function of the purge pump 520 in this embodiment.

During a state where purge gas cannot be supplied into the intake passage 501, for example, during a stoppage of the engine or the like, the canister 510 is closed and the CCV 517 of the canister 510 is kept in an open state. If during this state, the internal pressure of the fuel tank 512 rises due to vaporization of fuel and reaches a valve opening pressure of the vent valve 631, the vent valve 631 opens. As a result, mixture of fuel vapor and air flows from the space above the fuel liquid surface in the fuel tank 512 into the canister 510 via the breather piping 513, and passes through the fuel vapor adsorbent 550 in the canister 510, and flows into the atmosphere connecting pipe 518 via the CCV 517. Since fuel vapor in the mixture adsorbs to the adsorbent 550 during the passage the adsorbent 550, only the air from which fuel vapor has been removed by the adsorbent 550 in the canister 510 is discharged from the atmosphere connecting pipe 518. Therefore, atmospheric discharge of fuel vapor is prevented.

If the amount of fuel vapor adsorbed to the adsorbent 550 increases, the adsorbent 550 will become saturated with fuel vapor and therefore unable to adsorb any more fuel vapor. In this embodiment, therefore, purging is performed during operation of the engine so as to desorb fuel vapor from the adsorbent 550 (purge).

In the case of a typical engine, the purging of the canister 510 is performed by opening both the CCV 517 and the purge control valve 515 and thereby introducing air into the canister 510 during operation of the engine 600. That is, during operation of a typical engine, a negative pressure exists in the intake passage 501 downstream of the throttle valve 506. Therefore, if the purge control valve 515 is opened during operation of the engine, negative pressure from the intake passage 501 acts in the canister 510 via the purge piping 514, so that the canister internal pressure becomes lower than the atmospheric pressure.

Hence, when the purge control valve 515 is opened, clean air from which extraneous materials or the like have been removed by the air filter 519 flows from the atmosphere connecting pipe 518 into the canister 510 via the CCV 517. The clean air releases fuel vapor from the adsorbent 550 when passing through the adsorbent 550 in the canister 510, and forms a mixed gas (purge gas) of fuel vapor and air, which flows from the purge piping 514 into the engine intake passage 501 via the purge control valve 515. Therefore, the purge gas, after being purged from the adsorbent 550, burns in the combustion chambers of the engine. Thus, saturation of the adsorbent 550 with fuel vapor is prevented.

However, this embodiment adopts the engine 600 that conducts lean air-fuel ratio combustion. During the lean air-fuel ratio operation of the engine 600, substantially no negative pressure occurs in the intake passage. Therefore, during the lean air-fuel ratio operation of the engine 600, it is difficult to draw the purge gas into the intake passage based on the negative pressure in the intake passage. Hence, in this embodiment, the purge pump 520 is disposed on the purge piping 514 so as to perform the purging for the canister. During operation of the engine, the purge pump 520 is driven in the forward rotational direction to suck purge gas from the canister and to pressurize the gas and deliver it from the purge piping 514 into the intake passage 501. Therefore, air is drawn from the atmosphere connecting pipe 518 into the canister 510 via the CCV 517 so as to purge fuel vapor from the adsorbent 550. Hence, even during the lean air-fuel ratio operation, during which substantially no negative pressure occurs in the intake passage, the purging of the canister 510 can be normally performed so as to prevent saturation of the adsorbent 550 with fuel vapor.

Instead of providing the purge pump on the purge piping 514, it is possible to provide the atmosphere connecting pipe 518 with an air pump that delivers air into the canister to purge fuel vapor from the adsorbent 550 so that purge gas is discharged into the intake passage 501.

Although the purge system is able to prevent atmospheric discharge of fuel vapor produced in the fuel tank 512 as described above, the system is unable to prevent atmospheric discharge of fuel vapor produced in the intake passage and, more particularly, fuel vapor produced in the intake passage after the engine stops.

For example, during operation of the engine, a portion of the fuel injected from the fuel injection valve 601 immediately deposits on an intake port wall surface in the form of liquid, thus forming a wall attached fuel. The wall attached fuel gradually vaporizes to form fuel vapor after the engine stops. Furthermore, during a stoppage of the engine, a small amount of fuel held in the fuel injection valve may leak from the fuel injection valve into the intake port, that is, generally termed oil-tight leakage of the fuel injection valve may occur. The fuel that flows into the intake port due to the oil-tight leakage vaporizes to form fuel vapor during a stoppage of the engine as is the case with the wall attached fuel. Therefore, after the engine stops, fuel vapor produced in the intake port fills the intake passage 501.

If the intake passage 501 is filled with fuel vapor during a stoppage of the engine, fuel vapor comes to flow out of the intake passage 501 into the atmosphere via an air element of the air cleaner 503, which may become a cause of atmospheric pollution.

In embodiments described below, atmospheric discharge of fuel vapor from the intake passage 501 after a stoppage of the engine is prevented by using the aforementioned purge pump 520.

Described below will be embodiments of a vapor discharge preventing operation after a stoppage of the engine (hereinafter, simply referred to as "vapor discharge preventing operation") using the purge pump 520 in the canister purge system shown in FIG. 17.

Firstly, a most fundamental embodiment of the vapor discharge preventing operation of the invention will be described.

In this embodiment, the purge pump 520 is operated in a reverse direction for a pre-set time after the engine stops. During the reverse operation of the purge pump 520, a fully open state of the purge control valve 515 is maintained. After the elapse of a certain time, the purge pump 520 is stopped, and the purge control valve 515 is completely closed. The CCV 517 is kept fully open after the engine stops. Therefore, the purge pump 520 sucks gas (a mixture of fuel vapor and air) from the intake passage 501 via the purge piping 514, and delivers it into the canister 510 via the purge piping 514.

The fuel vapor contained in the gas delivered into the canister 510 adsorbs to the adsorbent 550, so that only air without fuel vapor is discharged into the atmosphere via the CCV 517 and the atmosphere connecting pipe 518. That is, fuel vapor produced in the intake passage 501 is delivered into the canister 510 by the purge pump 520, and adsorbs to the adsorbent 550, thereby preventing fuel vapor from being discharged into the atmosphere from the intake passage 501 after the engine 600 stops.

It should be noted herein that the duration of the reverse operation of the purge pump 520 following the stoppage of the engine is pre-set at a duration that is sufficient for adsorption of the entire amount of fuel vapor produced in the intake passage 501.

Figure 18:
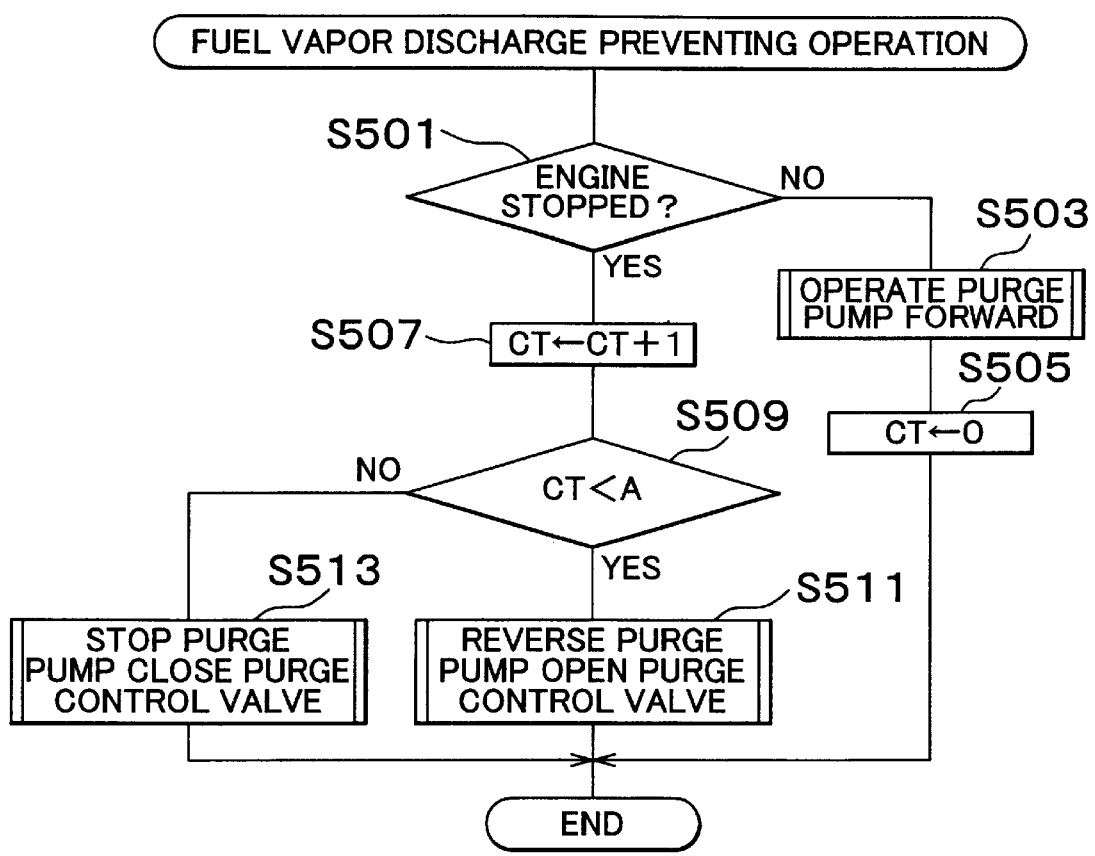
FIG. 18 is a flowchart illustrating a first embodiment of the fuel vapor discharge preventing operation.

FIG. 18 is a flowchart illustrating the aforementioned vapor discharge preventing operation of this embodiment in detail. This operation is performed as a routine executed by the ECU 530 at predetermined time intervals.

In the operation illustrated in FIG. 18, it is first determined in step S501 whether the engine is presently at rest (i.e., stopped). If the engine is not presently at rest, that is, if the engine is in operation, the process proceeds to step S503, in which a normal control of the purge pump (operation in the forward direction) is performed, and the normal purging of the canister is performed. Subsequently in step S505, the value of a time counter CT is reset to zero.

If the engine is presently at rest in step S501, the process proceeds to step S507, in which the value of the counter CT is increased by "1". Since the counter CT is always reset to zero in step S505 during operation of the engine, the value of the counter CT incremented in step S507 corresponds to the elapsed time following the stoppage of the engine.

Subsequently in step S509, it is determined whether the value of the counter CT after being increased reaches a predetermined value A, that is, whether a predetermined time corresponding to the counter value A has elapsed following the stoppage of the engine. Until the predetermined time elapses following the stoppage of the engine, the purge pump 520 is operated in the reverse direction and the purge control valve 515 is kept fully open in step S511.

Therefore, fuel vapor produced in the intake passage 501 after the stoppage of the engine is delivered to the canister 510 by the purge pump 520, and adsorbs to the adsorbent 550. Conversely, if the elapsed time following the stoppage of the engine reaches the predetermined time, the process proceeds to step S513, in which the operation of the purge pump 520 is stopped and the purge control valve 515 is closed.

The counter value A in step S509 is set at a value corresponding to a time that is needed before the entire amount of fuel in the intake passage 501 vaporizes and is delivered into the canister 510 from the intake passage by the purge pump 520 after the stoppage of the engine. It is preferable that this value be set based on experiments using a real engine and an intake passage because the value varies depending on the types of engine and the intake passage 501.

SEVENTH EMBODIMENT

A seventh embodiment regarding the fuel vapor discharge preventing operation of the invention will next be described.

In this embodiment, the purge pump is reversely operated so that fuel vapor from an intake passage adsorbs to a canister during a predetermined time after the engine stops as in the sixth embodiment. However, this embodiment differs from the above-described embodiment in that if the engine cooling water temperature is less than or equal to a predetermined value T0, the operation of the purge pump is not started, and in that if the cooling water temperature becomes less than or equal to the predetermined value T0 during the operation of the purge pump, the operation of the purge pump is stopped.

As the engine temperature decreases, fuel remaining in the intake passage becomes less likely to vaporize, and the fuel vapor concentration in the intake passage becomes lower. If during such a state, the purge pump is operated, the purge pump cannot efficiently suck fuel vapor from the intake passage, and energy for driving the purge pump is uselessly consumed. Furthermore, fuel vapor adsorbed to the canister 510 may be purged by air delivered from the intake passage by the purge pump 520, and may be discharged out via the atmosphere connecting pipe 518. Besides, since the fuel vapor concentration in the intake passage is low during this state, fuel vapor will not flow from the intake passage into the atmosphere even if the state is allowed to continue.

Therefore, in this embodiment, the cooling water temperature THW is detected as a parameter that represents the engine temperature. If the cooling water temperature THW is lower than or equal to the predetermined temperature T0, the purge pump is stopped so as to prevent useless consumption of power.

Figure 19:
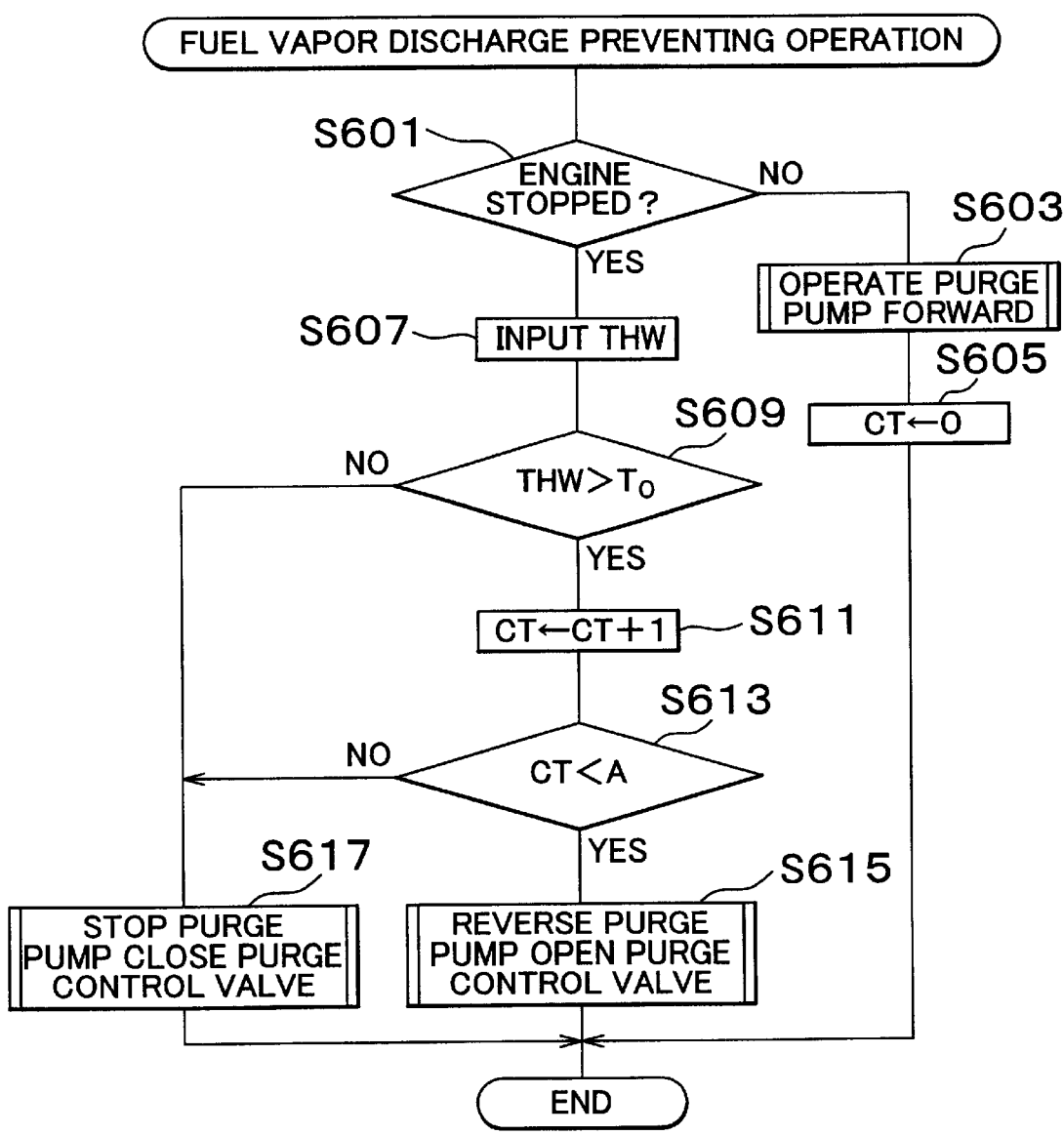
FIG. 19 is a flowchart illustrating a second embodiment of the fuel vapor discharge preventing operation.

FIG. 19 is a flowchart illustrating a fuel vapor discharge preventing operation of this embodiment in detail. This operation is performed as a routine executed by the ECU 530 at predetermined time intervals.

The operation illustrated in FIG. 19 differs from the operation illustrated in FIG. 18 only in that steps S607 and S609 are added. That is, in this embodiment, the cooling water temperature THW is inputted in step S607. If it is determined in step S609 that the cooling water temperature THW is less than or equal to the predetermined value T0 (which is approximately set at a low temperature at which vapor from the fuel in the intake passage stops leaking outside, for example, 10° C. in the cooling water temperature), the process immediately proceeds to step S617, in which the operation of the purge pump 520 is stopped and the purge control valve 515 is completely closed. The process starting at step S611 is performed to operate the purge pump 520 until the elapse of a predetermined time, only if the cooling water temperature THW is higher than the predetermined temperature T0. The process of steps S601 to S605 and the process of steps S611 to S617 in FIG. 19 are the same as the processes of steps S501 to S505 and S507 to S513 in FIG. 18, and will not be described again.

This embodiment avoids discharge of fuel vapor from the intake passage due to the above-described operation, and can reduce the energy consumption for driving the purge pump.

EIGHTH EMBODIMENT

An eighth embodiment of the fuel vapor discharge preventing operation of the invention will next be described.

In the above-described sixth embodiment of the fuel vapor discharge preventing operation, the operation of the purge pump is started simultaneously with a stoppage of the engine, and is continued for a predetermined time in all cases. In reality, however, the amount of fuel vapor produced in the intake passage is greatly affected by the engine temperature and, more particularly, the engine temperature at the time of stoppage of the engine.

For example, if the engine temperature at the time of stoppage of the engine is high, fuel remaining in the intake port rapidly vaporizes after the stoppage of the engine, so that a great amount of fuel vapor is produced in a short time. Furthermore, since the purge piping 514 is connected to the intake passage 501 at a position relatively remote from the intake port, the fuel vapor produced in the intake port reaches the connecting portion to the purge piping 514 after the elapse of a certain time following the stoppage of the engine. The length of time before the fuel vapor reaches the connecting portion reduces with increases in the amount of fuel vapor produced. Still further, since the amount of fuel vapor produced (production rate) increases with increases in the engine temperature, the fuel remaining in the intake port entirely vaporizes if the engine temperature is high.

In contrast, if the engine temperature at the time of stoppage of the engine is low, an increased amount of fuel is injected for a warm-up purpose before the stoppage of the engine, so that the amount of fuel attached to the intake port wall surface is greater in the case of low engine temperature than in the case of high engine temperature. Furthermore, due to low engine temperature, the fuel vaporization rate is lower than in the case of high temperature, so that a long time is needed for the entire amount of fuel to vaporize. Still further, it takes a longer time for fuel vapor produced in the intake port to reach the intake passage connecting portion of the purge piping 514 in the case of low temperature than in the case of high temperature.

In this embodiment, therefore, the operation of the purge pump is not performed immediately after the stoppage of the engine. Instead, the operation of the purge pump is started after a certain delay time B elapses following the stoppage of the engine. This delay time corresponds to a time that is needed for the fuel vapor produced in the intake port to reach the connecting portion of the purge piping 514 and is sucked into the purge pump 520, and is set at shorter lengths of time for higher engine temperatures (cooling water temperatures) at the time of the stoppage of the engine.

Furthermore, since the time needed for vaporization of the entire amount of fuel decreases with increases in the engine temperature at the time of the stoppage of the engine, the duration of operation of the purge pump 520 is set at shorter lengths of time for higher engine temperatures (higher cooling water temperatures) at the time of the stoppage of the engine.

In this embodiment, therefore, it becomes possible to operate the purge pump 520 with the timing and the duration that are truly needed. Hence, useless consumption of energy for driving the purge pump can be prevented.

Figure 20:
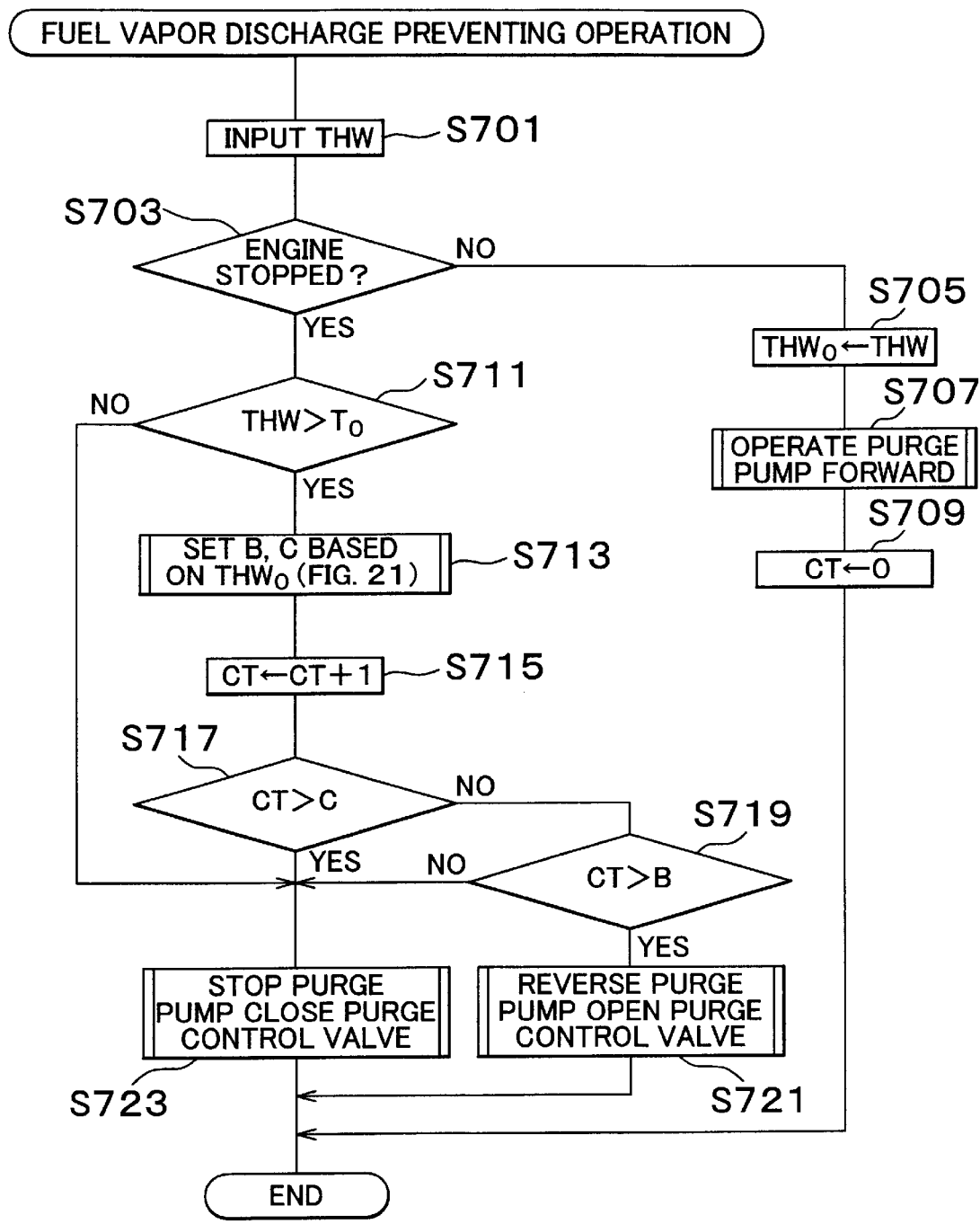
FIG. 20 is a flowchart illustrating a third embodiment of the fuel vapor discharge preventing operation.

FIG. 20 is a flowchart illustrating the fuel vapor discharge preventing operation of this embodiment in detail. This operation is performed as a routine executed by the ECU 530 at predetermined time intervals.

In the operation illustrated in FIG. 20, the engine cooling water temperature THW is input in step S701. Subsequently in step S703, it is determined whether the engine is presently at rest (i.e., stopped). If the engine is in operation, the process proceeds to step S705, in which the cooling water temperature THW input in step S701 is stored as THW0. Subsequently in step S707, a normal purge pump control is performed, and in step S709, the value of a time counter CT is reset to zero, as in the operations illustrated in FIGS. 18 and 19. Since the latest cooling water temperature is stored as THW0 in step S705 only if the engine is in operation, the value THW0 after the stoppage of the engine indicates the cooling water temperature occurring at the time of the stoppage of the engine.

If the engine is at rest in step S703, the process proceeds to step S711, in which it is determined whether the present cooling water temperature input in step S701 (which is not the cooling water temperature at the time of the stoppage of the engine) is higher than a predetermined value T0 (T0 ≈10° C.). If the present cooling water temperature is less than or equal to T0, the process proceeds to step S723, in which the operation of the purge pump 520 is stopped and the purge control valve 515 is completely closed. That is, in this embodiment, if the engine temperature at the time of the stoppage of the engine is low, the operation of the purge pump 520 is not performed, as in the above-described sixth embodiment of the fuel vapor discharge preventing operation.

If THW>T0 in step S711, the process proceeds to step S713, in which the start timing and the stop timing of the operation of the purge pump 520 are determined based on the cooling water temperature THW0 at the time of stoppage of the engine stored in step S705.

Figure 21:
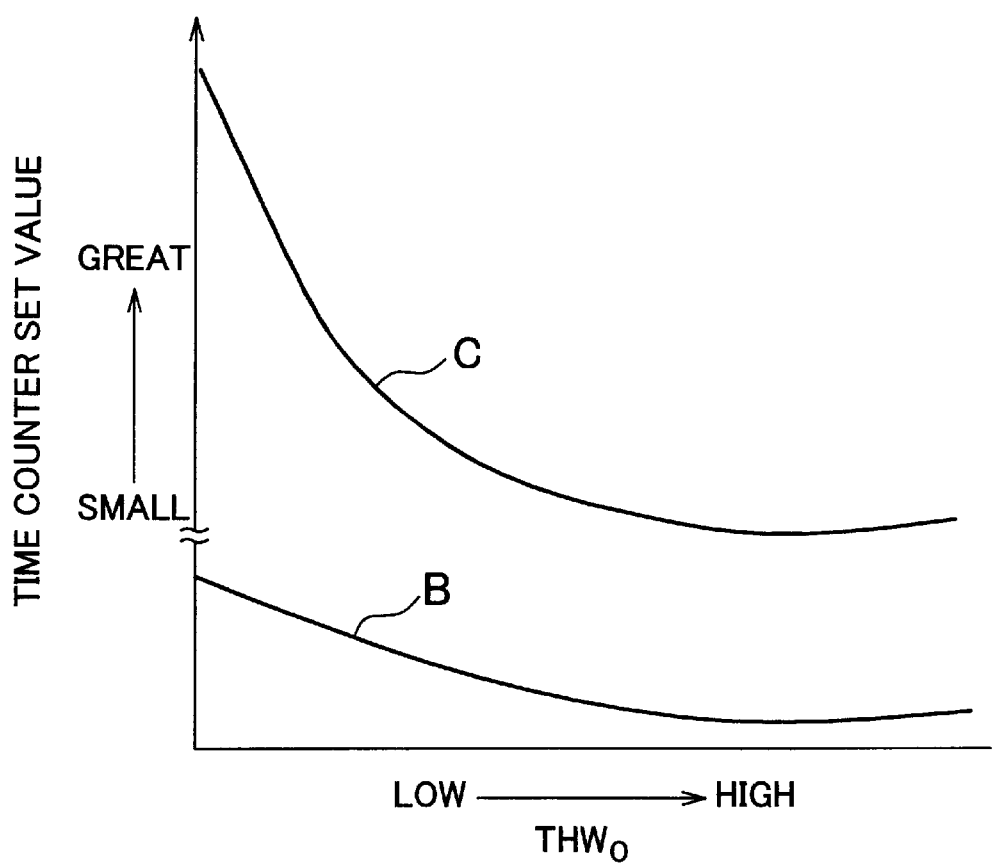
FIG. 21 is a diagram indicating the setting of a pump operating duration in the operation illustrated in FIG. 4.

The start and stop timings of the operation of the purge pump 520 are compared to the value of the counter CT as in the foregoing embodiments. FIG. 21 is a diagram indicating relationships of the cooling water temperature THW0 at the time of stoppage of the engine with the operation start counter value B and the operation stop counter value C of the purge pump 520.

As indicated in FIG. 21, the counter values B, C (B<C) are both set at smaller values corresponding to higher cooling water temperatures THW0 at the time of stoppage of the engine, and the difference between the value C and the value B also decreases with increases in the cooling water temperature THW0. That is, as the cooling water temperature at the time of stoppage of the engine is higher, the time B between the stoppage of the engine and the start of operation of the purge pump 520 becomes shorter, and the operation duration of the purge pump 520 (C–B) also becomes shorter. Therefore, the purge pump 520 can be operated for a period that is truly needed.

After the counter values B and C are determined, the value of the counter CT is increased by "1" in step S715. In this embodiment, the value CT indicates the elapsed time following the stoppage of the engine, as in the foregoing embodiments.

Subsequently in steps S717 to S723, the purge pump 520 is operated and the purge control valve 515 is kept open only if the value of the counter CT is within the range of B<CT<C. If CT<B or CT>C, the purge pump 520 is stopped and the purge control valve 515 is closed. Therefore, the purge pump 520 starts operating at the elapse of a time corresponding to the counter value B following the stoppage of the engine, and the purge pump 520 stops operating at the elapse of a time corresponding to the counter value C. Thus, the purge pump 520 is operated for a truly needed period.

NINTH EMBODIMENT

A ninth embodiment of the invention will next be described.

In the foregoing embodiments, the purge pump is operated only once at the time of stoppage of the engine, so as to collect fuel vapor from the intake passage into the canister. However, fuel that does not vaporize remains in the intake port after the stoppage of the operation of the purge pump, except when the engine temperature at the time of stoppage of the engine is high so that the entire amount of fuel remaining in the intake port is recovered as vapor. As mentioned above, the remaining fuel is not discharged as fuel vapor into the atmosphere as long as the engine temperature remains low.

However, if the engine temperature rises due to the effect of an ambient temperature rise, direct sunlight or the like after the engine stops, fuel remaining in the intake port may vaporize and fuel vapor may be discharged into the atmosphere.

In this embodiment, even after fuel vapor is recovered into the canister by operating the purge pump immediately after the stoppage of the engine, the purge pump is operated again to recover fuel vapor into the canister in accordance with engine temperature rise if the engine temperature during the stoppage of the engine becomes higher the engine temperature at the time of stoppage of the engine. Therefore, even if the engine temperature rises after stoppage of the engine, atmospheric discharge of fuel vapor via the intake passage is prevented.

Figure 22:
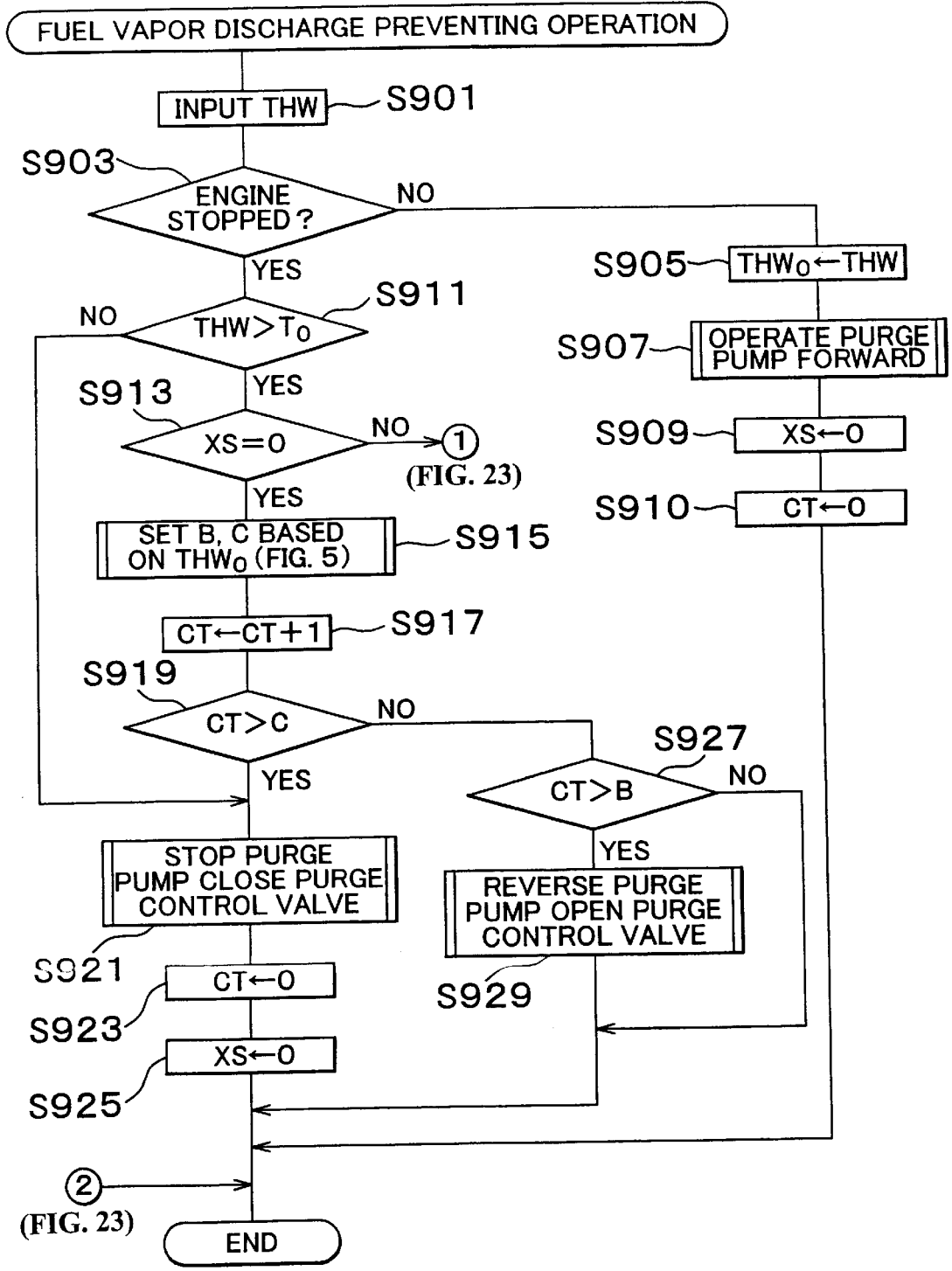
FIG. 22 is a portion of a flowchart illustrating a fourth embodiment of the fuel vapor discharge preventing operation.
Figure 23:
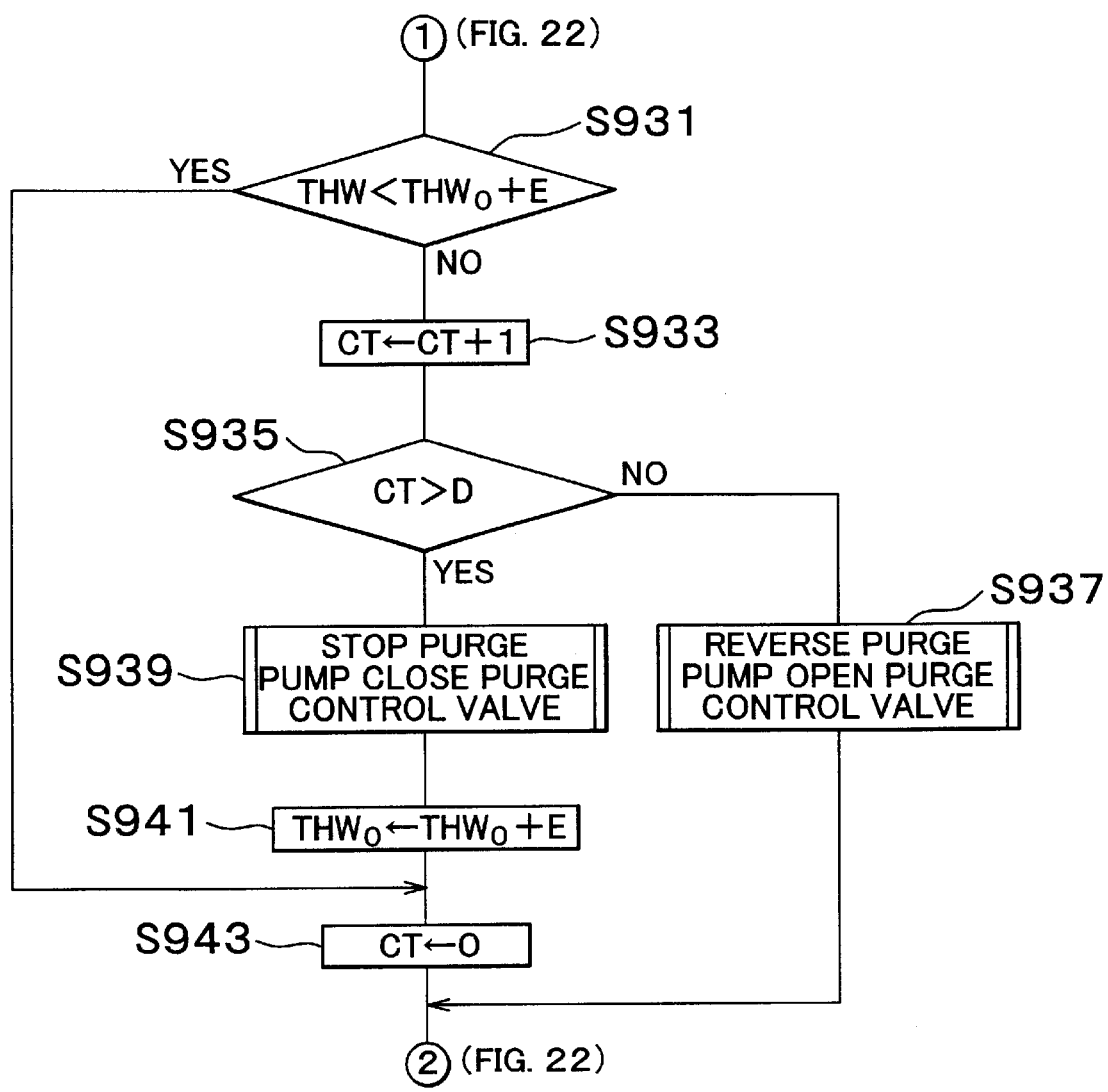
FIG. 23 is another portion of the flowchart illustrating the fourth embodiment of the fuel vapor discharge preventing operation.

FIGS. 22 and 23 show a flowchart illustrating a fuel vapor discharge preventing operation of this embodiment in detail. This operation is performed as a routine executed by the ECU 530 at predetermined time intervals.

Steps S901 to S925 in FIG. 22 illustrate a purge pump operating process that immediately follows the stoppage of the engine. The operation illustrated in FIG. 22 is substantially the same as the operation illustrated in FIG. 20, except that an operation of a flag XS in steps S909, S913 and S925 is added.

That is, in this embodiment, too, the cooling water temperature THW at the time of the stoppage of the engine is stored as THW0 (step S905). On the basis of the temperature THW0, the start timing B and the stop timing C of the operation of the purge pump 520 are determined with reference to the relationship indicated in FIG. 21 (step S915). When the value of the counter CT reaches B after the engine stops, the operation of the purge pump 520 (and the opening of the purge control valve 515) is started (steps S927 and S929). When the value of the counter CT reaches C, the operation of the purge pump 520 is stopped (steps S919 and S921). The process of FIG. 22 is also similar to the process of FIG. 20 in that if the cooling water temperature THW is less than or equal to the predetermined value T0, the purge pump 520 is not operated (steps S911 and S921). Steps S903, S907 and S917 are similar to steps S703, S707 and S715, respectively.

In the process of FIG. 22, however, if it is determined in step S913 that the value of the flag XS equals 1 (XS=1), the process proceeds to step S931 without execution of the process starting at step S915, unlike the process of FIG. 20. The flag XS indicates whether the first operation of the purge pump 520 immediately after the stoppage of the engine is completed. During operation of the engine, the flag XS is always set to "0" together with the value of the counter CT (steps S910 and S909). The flag XS is set to "1" in step S925 after the operation of the purge pump 520 immediately after the stoppage of the engine ends. Simultaneously, the value of the counter CT is reset to zero (step S923).

That is, in this embodiment, if the first operation of the purge pump 520 immediately following the stoppage of the engine has ended, the next cycle of the process proceeds to step S931 in FIG. 23 without execution of steps S913 to S925.

In step S931 in FIG. 23, a determination is made as to whether the present cooling water temperature THW input in step S901 is at least a predetermined value E greater than the cooling water temperature THW0 detected at the time of the stoppage of the engine. If the present cooling water temperature THW does not exceed the temperature THW0 by at least the predetermined value E, the process proceeds to step S943, in which the value of the counter CT is reset. Then, the present process ends.

If THW≧THW0+E in step S931, the process of steps S933 to S937 is performed. That is, the value of the counter CT is increased (step S933). The purge pump 520 is operated and the purge control valve 515 is opened until the value of the counter CT reaches a predetermined value D (steps S935 and S937). When the value D is reached, the purge pump is stopped and the purge control value is closed (steps S935 and S939). If the purge pump is stopped when the counter value has reached the value D, the value THW0 stored as the cooling water temperature at the time of the stoppage of the engine is increased by the predetermined value E in step 641.

That is, in this embodiment, the purge pump is operated immediately after the engine stops. After that, the purge pump is operated again if the engine temperature (cooling water temperature) rises by a predetermined amount. The temperature for starting to operate the purge pump again is set at a temperature that is the predetermined amount E higher than the temperature used as the criterion to start the previous operation of the purge pump. The temperature for starting to operate the purge pump during a stoppage of the engine is gradually increased for the following reasons.

That is, if the operation of the purge pump immediately following a stoppage of the engine has been performed and completed, the components of the fuel remaining in the engine intake port which are vaporizable at the cooling water temperature (THW0) occurring at the time of the stoppage of the engine have been entirely gasified and recovered in the form of vapor in the canister. Therefore, even if the engine temperature, which has fallen following the stoppage of the engine, rises again to the value THW0, the vaporization of the remaining fuel is very little. Therefore, operation of the purge pump in such a condition will not recover fuel vapor into the canister. However, if the engine temperature exceeds the value THW0, residual fuel that did not gasify at the temperature THW0 gasifies, so that the intake passage becomes filled with fuel vapor. In this embodiment, therefore, the second operation of the purge pump is performed if the cooling water temperature THW exceeds the temperature THW0 occurring at the time of the stoppage of the engine by the predetermined value E.

If the second operation of the purge pump is completed, the components of the fuel remaining in the intake port which are vaporizable at or below the temperature THW0+E have been entirely vaporized and have been entirely recovered into the canister due to the first and second operations of the purge pump. Therefore, if the cooling water temperature rises to THW0+E again, substantially no vaporization of fuel occurs.

Hence, the temperature for starting the third operation of the purge pump is set at a value that is higher than the starting temperature for the previous (second) operation by the value E.

Since the temperature for starting an operation of the purge pump during a stoppage of the engine is set higher than the previous operation starting temperature by the value E, it becomes possible to prevent an event that the purge pump is operated although fuel vapor does not exist in the intake passage. Therefore, useless consumption of energy for driving the purge pump is prevented, and atmospheric discharge of fuel vapor purged from the canister via the atmosphere connecting pipe by operating the purge pump is prevented.

OTHER EMBODIMENTS

Modifications of the sixth to ninth embodiments will next be described.

In the eighth and ninth embodiments (FIGS. 20 to 23), the duration of the operation of the purge pump (time corresponding to C–B) immediately following a stoppage of the engine is set in accordance with the cooling water temperature occurring at the time of the stoppage of the engine. This duration corresponds to a time that is sufficient to recover the entire amount of fuel vapor produced in the intake passage into the canister. However, for the recovery of the entire amount of fuel vapor, it is also possible to change the amount of flow of the pump in accordance with the amount of fuel vapor instead of changing the operating duration of the pump in accordance with the amount of fuel vapor.

For example, in step S713 in FIG. 20 and step S915 in FIG. 22, the rotational speed of the pump is fixed, and the operating duration of the pump is increased with decreases in the cooling water temperature at the time of the stoppage of the engine. In reality, however, if the cooling water temperature at the time of the stoppage of the engine is higher, fuel vapor is more rapidly produced following the stoppage of the engine, so that the recovery of fuel vapor into the canister via the intake passage is completed in a reduced time. If in this case, the operation of the purge pump is continued for a long time after completion of the recovery of fuel vapor, air is supplied from the purge pump to the canister, so that fuel vapor adsorbed to the canister may be purged and may be discharged into the atmosphere via the CCV 517 and the atmosphere connecting pipe 518. Therefore, it is also possible to adopt a construction in which the capacity of the purge pump is controlled in accordance with the production of fuel vapor; more specifically, if the amount of fuel vapor produced is great (i.e., if the concentration of fuel vapor in the intake passage is high), the capacity of the purge pump is increased, and the operating duration of the pump is reduced from the durations indicated in FIGS. 20 and 22. Therefore, it becomes possible to recover high-concentration fuel vapor in a reduced time and avoid afterward feeding of air to the canister. Thus, atmospheric discharge of fuel vapor from the canister can be completely prevented.

The capacity adjustment of the purge pump can be accomplished by, for example, changing the voltage applied to the drive motor. In this case, if the cooling water temperature at the time of a stoppage of the engine is higher, the capacity of the pump can be increased by increasing the voltage so as to increase the rotational speed of the pump.

Furthermore, in the case where the second and later operations of the purge pump following a stoppage of the engine are to be performed, for example, in the process illustrated in FIG. 23, it is also possible to increase the rotational speed of the pump and reduce the set operating duration D (step S935) with increases in the engine temperature (THW0+E) for starting to operate the pump. Still further, instead of changing the amount of flow of the purge pump by changing the rotation speed of the pump, it is possible to change the amount of flow of the pump by changing the degree of opening of the purge control valve 515.

Although the seventh to ninth embodiments are described in conjunction with a construction in which the purge pump 520 is disposed between the purge control valve 515 and the canister 510 as shown in FIG. 17, the location of the purge pump is not limited to those indicated in the drawings.

Figure 24:
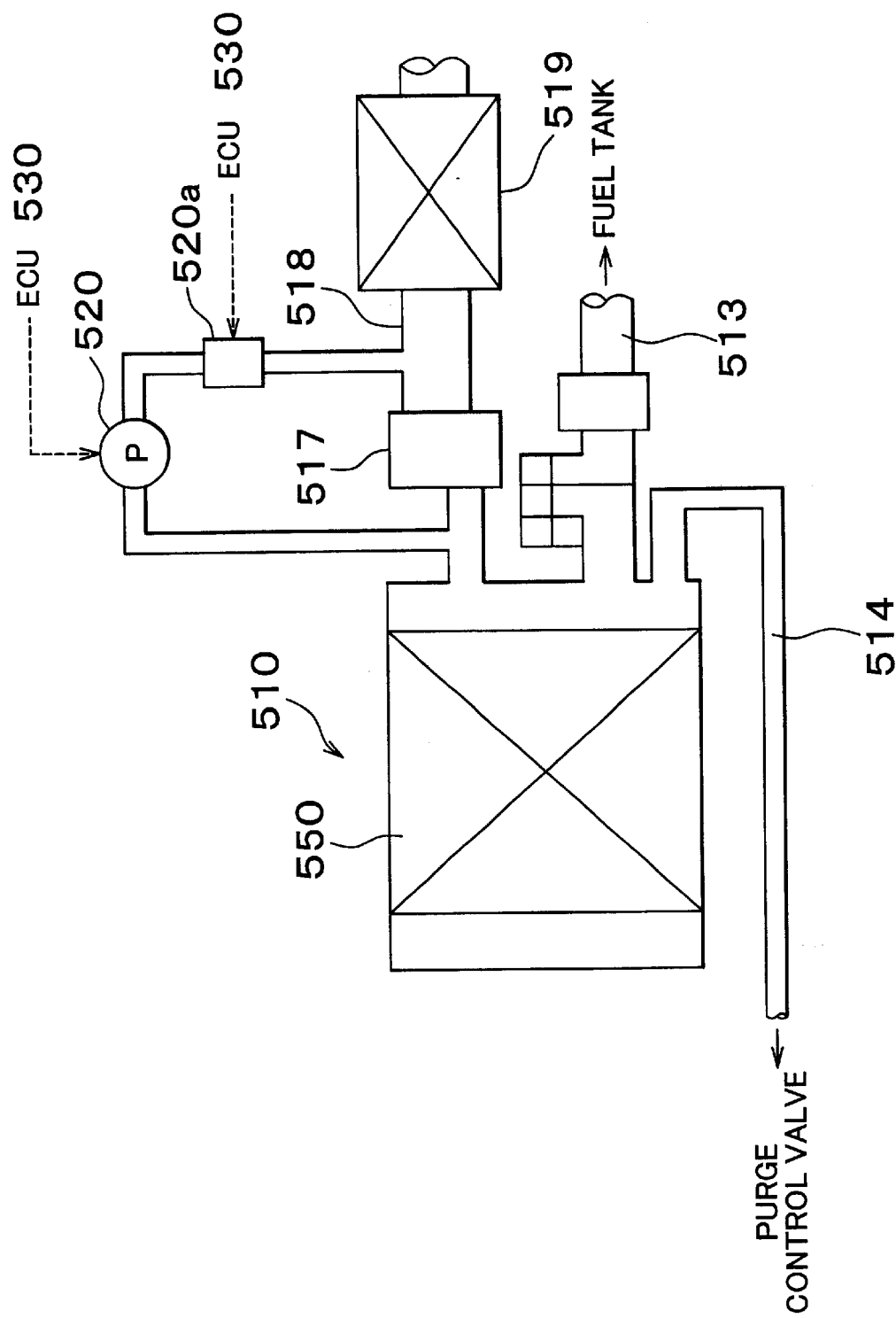
FIG. 24 is a diagram showing an arrangement of a purge pump different from that shown in FIG. 1.

For example, FIG. 24 illustrates a construction in which the purge pump 520 and a shut-off valve 520a are disposed in parallel with the CCV 517 with respect to the atmospheric port of the canister 510. In the arrangement shown in FIG. 24, if sufficient negative pressure occurs in the intake passage 501 during an operation of the engine, the purge pump 520 is stopped, and the shut-off valve 520a is closed, and the CCV 517 is opened. Therefore, atmospheric air is introduced into the canister via the CCV 517, and then flows into the intake passage after purging fuel vapor from the adsorbent 550.

Conversely, if sufficient negative pressure is not present in the intake passage during an operation of the engine, the CCV 517 is closed, and the purge control valve 515 and the shut-off valve 520a are opened, and the purge pump 520 is operated in the forward direction. Therefore, air is delivered into the canister 510 by the purge pump 520, so that the adsorbent 550 is purged.

During a stoppage of the engine, fuel vapor can be recovered in the canister 510 from the intake passage 501 via the purge piping 514 by closing the CCV 517, and opening the purge control valve 515 and the shut-off valve 520a, and operating the purge pump 520 in the reverse direction. In this case, the fuel vapor discharge preventing operations of the foregoing embodiments can be performed without any modification.

Figure 25:
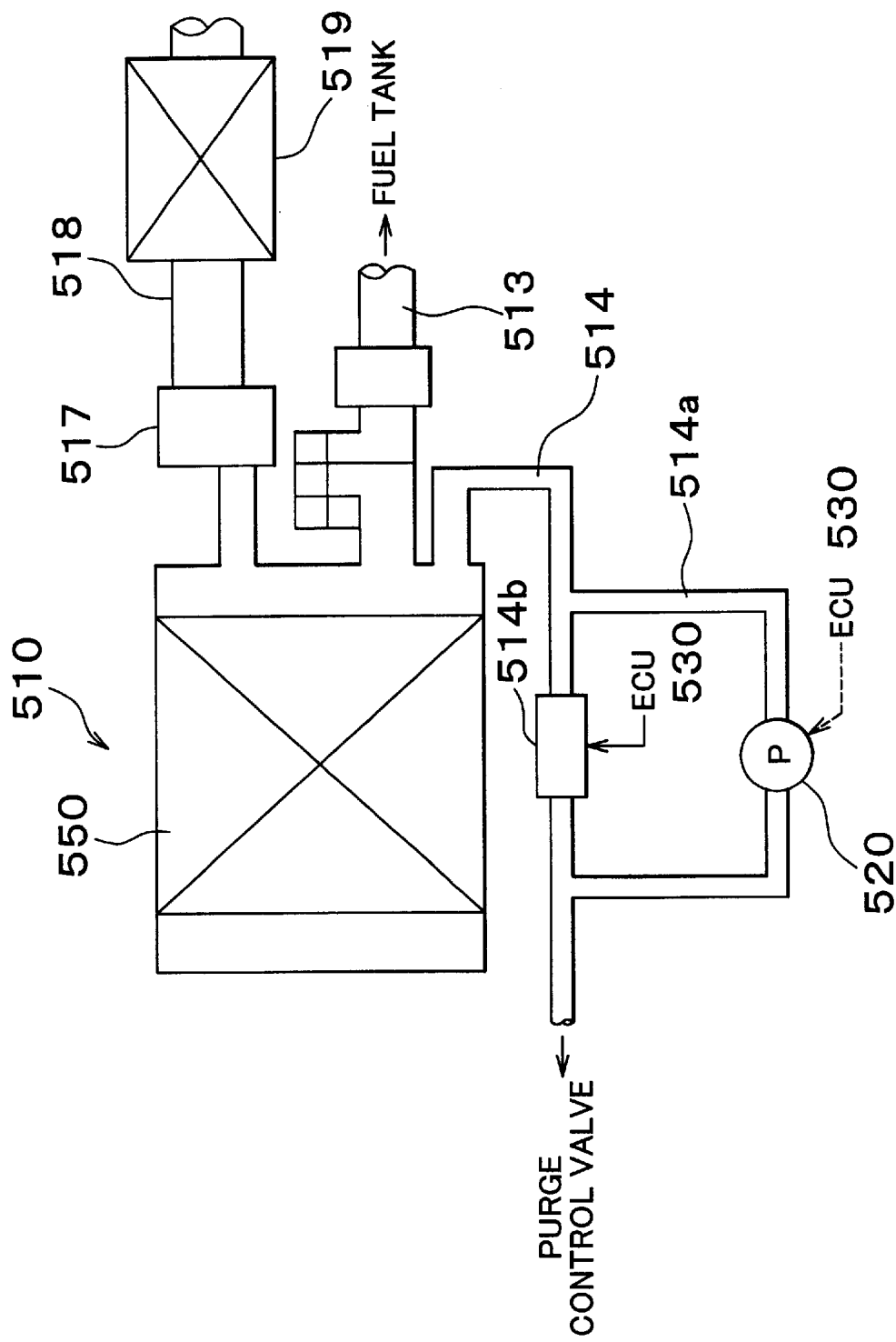
FIG. 25 is a diagram showing an arrangement of a purge pump different from those shown in FIGS. 17 and 24.

FIG. 25 illustrates an arrangement in which a purge pump dedicated to the fuel vapor discharge preventing operation is provided. In the embodiment shown in FIG. 25, the purge pump 520 is disposed in a branch passage 514a that branches from the purge piping 514 and communicates with the canister 510 (or the fuel tank 512). A shut-off valve 514b is disposed in the purge piping 514 between the branching point to the branch passage 514a and the confluence point with the branch passage 514a.

In this embodiment, during operation of the engine, the shut-off valve 514b is always open, and the purge pump 520 is not operated. That is, the purging of the canister during operation of the engine is accomplished only by negative pressure in the intake passage.

If the fuel vapor discharge preventing operation is performed during a stoppage of the engine, the purge pump 520 is operated with the shut-off valve 514b closed and the purge control valve 515 opened. In this embodiment, the purge pump 520 is operated in only one direction, that is, such a direction as to suck fuel vapor from the intake passage 501 via the purge piping 514 and the branch passage 514a and eject fuel vapor toward the canister 510 (or the fuel tank 512), and is not operated in the reverse direction. Therefore, fuel vapor in the intake passage can be recovered in the canister or the fuel tank.

PURGE SYSTEM ABNORMALITY DETECTING OPERATION

Next described will be a purge system abnormality detecting operation using the purge pump 520. In this embodiment, the purge pump 520 is reversely operated after the elapse of a predetermined time following a stoppage of the engine so as to cause a differential pressure between the purge system internal pressure and the ambient atmospheric pressure. After the purge system is tightly closed in this state, it is determined whether there is a leak based on a change in the purge system internal pressure after the tight closure.

This will be described in conjunction with, for example, a construction in which the purge pump 520 is disposed in the purge piping 514 between the canister 510 and the intake passage 501 as shown in FIG. 17. If after a stoppage of the engine, the purge pump 520 is reversely operated with the CCV 517 of the canister 510 closed and the purge control valve 515 opened, fuel vapor or air is delivered from the intake passage 501 to the canister 510 by the purge pump 520. However, since the CCV 517 of the canister 510 is closed, air introduced into the canister 510 is not let out, so that the purge system that includes the canister 510, the breather piping 513, the fuel tank 512 connected to the canister 510 by the breather piping 513, etc. is pressurized.

If the purge control valve 515 is closed and the purge pump 520 is stopped while the purge system internal pressure is a predetermined positive pressure, the purge system is tightly closed in a pressurized state. If the purge system has no leak during this state, the purge system internal pressure does not change. If the purge system has a leak, air escapes out of the purge system, so that the pressure in the purge system decreases. The decreasing rate of the pressure increases in accordance with the magnitude of leak.

Therefore, the presence of a leak in the purge system can be determined by measuring a change in the purge system internal pressure (pressure decreasing rate) in the pressurized and tightly closed purge system.

In reality, however, if the temperature of fuel in the fuel tank 512 is high during the closed state of the purge system, fuel vaporizes, and therefore, the tank internal pressure rises. Therefore, if the amount of fuel vaporized is great, there may be a case where the pressure rise caused by the fuel vaporization offsets or reduces the pressure fall caused by a leak, if any, so that a reduced pressure fall results.

Therefore, in this embodiment, even if the pressure fall in the purge system in the pressurized and tightly closed state is small, it is not immediately determined that the system is normal, but the amount of fuel vapor produced in the fuel tank is measured.

The measurement of the amount of fuel vapor produced is performed by measuring a change in the internal pressure (pressure increasing rate) of the purge system that is tightly closed after the internal pressure has been reduced approximately to the atmospheric pressure. If the system internal pressure is kept at the atmospheric pressure, the pressure difference between the purge system and the outside reduces, so that even if the purge system has a leaking site, such as a hole or the like, neither entrance of air from outside nor leakage of gas from inside occurs. Therefore, if the purge system is tightly closed at the atmospheric pressure, the system internal pressure changes solely due to vaporization of fuel in the fuel tank. The pressure changing rate (rising rate) increases with increases in the amount of fuel vapor produced.

In this embodiment, if the internal pressure decreasing rate measured with respect to the pressurized and tightly closed purge system is greater than a predetermined value, it is immediately determined that the purge system has an abnormality, such as a leak, a hole or the like. However, if the decreasing rate of the internal pressure under the pressurized and tightly closed condition is less than a predetermined value, it is not immediately determined that the system is normal. Instead, the purge system is tightly closed at the atmospheric pressure, and the magnitude of the amount of fuel vapor produced is determined by measuring the changing (increasing) rate of the pressure in the closed system. If the pressure increasing rate is great (if the amount of fuel vapor produced is great), there is a possibility that the decreasing rate of the internal pressure may be reduced due to effect of fuel vapor despite the presence of an abnormality, such as a leak, a hole, etc. Therefore, if the measured increasing rate of the pressure is great (the amount of fuel vapor produced is great), the determination of normality of the system is not made, but the determination is suspended.

Conversely, if the measured increasing rate of the internal pressure is small (the amount of fuel vapor produced is small) under the tightly closed condition at the atmospheric pressure, it can be determined that the decreasing rate of the internal pressure under the pressurized and tightly closed state is small because of the absence of an abnormality, such as a leak, a hole or the like. In this case, therefore, it is determined that the purge system is normal.

Figure 26:
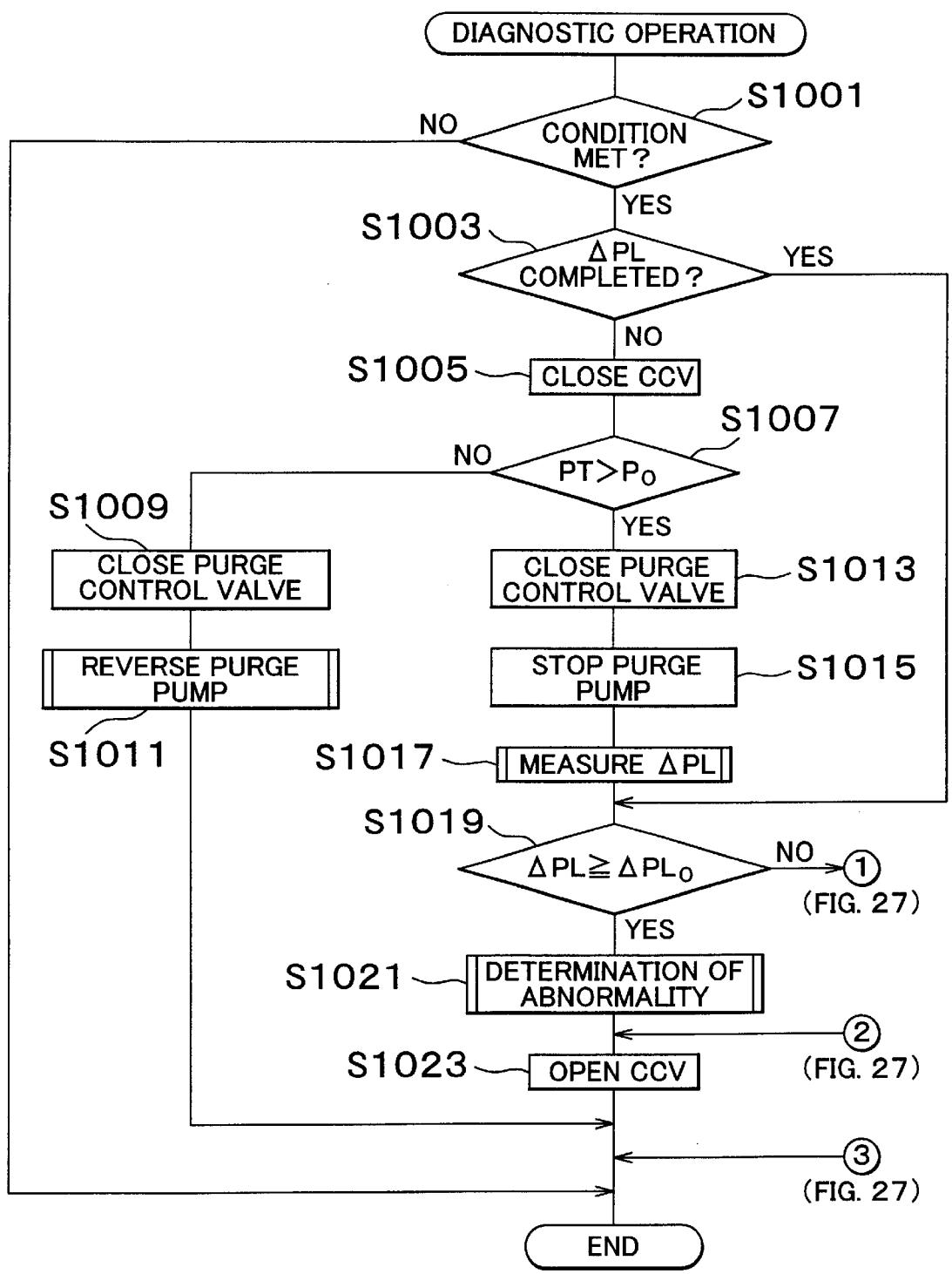
FIG. 26 is a portion of a flowchart illustrating a purge system diagnostic operation.
Figure 27:
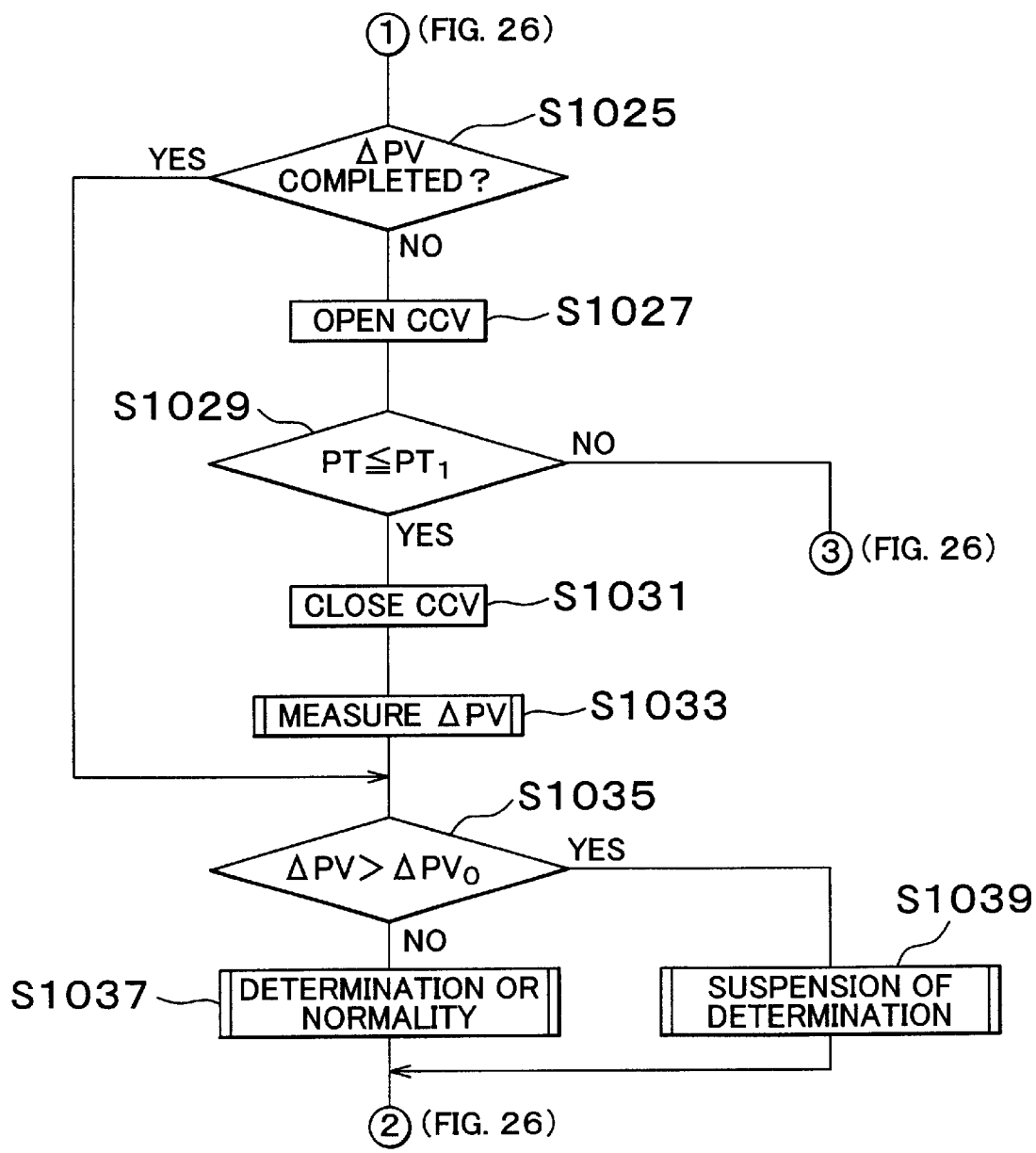
FIG. 27 is another portion of the flowchart illustrating the purge system diagnostic operation.

FIGS. 26 and 27 are a flowchart illustrating the purge system diagnostic operation in detail. This operation is performed as a routine executed by the ECU 530 at predetermined time intervals.

When the operation starts, it is determined in step S1001 in FIG. 26 whether a diagnostic executing condition is presently met.

The diagnostic executing condition considered in step S1001 includes: (a) a condition that the engine is at rest (i.e., stopped); (b) a condition that a predetermined time has elapsed following the stoppage of the engine; (c) a condition that the engine cooling water temperature is less than or equal to predetermined value; and (d) a condition that the abnormality detecting operation has not been performed following the stoppage of the engine.

The condition (a) in step S1001 is provided for the following reason. That is, in this diagnostic operation, the purge pump 520 is operated in a direction opposite to the direction of the normal purge operation, so as to feed air from the intake passage to the purge system. Therefore, if negative pressure exists in the intake passage during an operation of the engine, it may become difficult to pressurize the purge system.

The conditions (b) and (c) are provided so as to ensure that after the elapse of a sufficiently long time following the stoppage of the engine, the diagnostic is performed in a state that the temperature of fuel in the fuel tank has dropped approximately to the ambient temperature. As described above, if the temperature of fuel in the fuel tank is high, the amount of fuel vapor produced becomes great, so that the normality determination cannot be conducted, that is, the determination is suspended, even if the purge system actually does not have an abnormality, such as a leak, a hole, etc. During operation of the engine, high-temperature return fuel from the fuel injection valves flows into the fuel tank. Therefore, immediately after the stoppage of the engine, the internal pressure of the fuel tank is relatively high, and therefore, the amount of fuel vapor produced is great. However, since a sufficiently long time has elapsed following the stoppage of the engine and the cooling water temperature is low, the temperature of fuel in the fuel tank is also sufficiently low, so that the amount of fuel vapor produced is small. Therefore, if the diagnostic operation is performed after the conditions (b) and (c) have been met, it becomes possible to increase the opportunities of determining whether the system is normal.

Furthermore, the condition (d) is provided in order to prevent an event that the diagnostic operation is performed many times and energy for driving the purge pump is uselessly consumed.

If any one of the conditions is not met, the operation is immediately ended without execution of the diagnostic operation. That is, the diagnostic operation starting at step S1003 is performed only if all the conditions in step S1001 are met.

In step S1003, it is determined whether detection of the pressure decreasing rate (ΔPL) of the purge system in the pressurized and tightly closed state has ended. As described above, the result of measurement of ΔPL is used to determine whether the system has an abnormality such as a hole or the like.

If measurement of ΔPL is not completed in step S1003, ΔPL is measured while the purge system is pressurized and tightly closed, in steps S1005 to S1017.

That is, in step S1005, the CCV 517 of the canister 510 is closed. In steps S1007 to S1011, until the pressure PT in the fuel tank 512 detected by the pressure sensor 533 reaches a predetermined positive pressure P0 (e.g., P0≈20 mmHg) (step S1007), the purge control valve 515 is kept open (step S1009) and the purge pump 520 is reversely operated (step S1011). Therefore, air in the intake passage 501 is fed to the canister 510 by the purge pump 520, thereby pressurizing the purge system of the canister 510, the breather piping 513, the fuel tank 512, etc.

If the internal pressure PT of the fuel tank 512 reaches P0 due to the reverse operation of the purge pump 520, step S1007 is followed by steps S1013 and S1015, in which the purge control valve 515 is closed and the operation of the purge pump 520 is stopped.

Subsequently in step S1017, a reduction ΔPL in the internal pressure (pressure decreasing rate) of the purge system in a set time (e.g., about 5 seconds) is determined from the change in the fuel tank internal pressure detected by the pressure sensor 533.

After the determination of ΔPL is completed in step S1017, or if it is determined in step S1003 that the determination of ΔPL is completed in the past cycles of the operation, it is then determined in step S1019 whether the pressure decreasing rate ΔPL is greater than or equal to a predetermined value ΔPL0 (e.g., ΔPL0 is a value corresponding to about several mmHg/5 seconds).

If the pressure decreasing rate ΔPL is greater than or equal to the predetermined value, that is, ΔPL≧ΔPL0, in step S1019, it is considered that the reduction in the internal pressure of the purge system in the pressurized and tightly closed state is great, and that there may be a possibility of a leak that is greater than the amount of fuel vapor produced in the fuel tank 512 even if the amount is great. Therefore, in this case, the process proceeds to step S1021, in which it is immediately determined that the purge system has an abnormality, such as a leak, a hole or the like (determination of abnormality). Subsequently in step S1023, the CCV 517 of the canister 510 is opened. After that, the operation ends. Therefore, the purge system internal pressure returns to the atmospheric pressure.

Conversely, if ΔPL<ΔPL0 in step S1019, the pressure decreasing rate of the purge system in the pressurized and tightly closed state is small, so that it appears that the purge system does not have an abnormality, such as a leak, a hole, etc. However, in this case, there is a possibility that a great amount of fuel vapor is produced and adds to the pressure, and therefore makes ΔPL appear small despite an abnormality, such as a leak, a hole, etc.

In this embodiment, therefore, if ΔPL<ΔPL0 in step S1019, the determination of normality is not immediately made, but the process proceeds to step S1025 in FIG. 27 in order to measure the present amount of fuel vapor produced ΔPV.

That is, in this case, it is determined in step S1025 in FIG. 27 whether the measurement of the amount of fuel vapor produced ΔPV is completed in the past cycles of operation. If the measurement has not been completed, steps S1027 to S1033 are executed. That is, until the purge system internal pressure PT becomes less than or equal to a predetermined PT1 (step S1029), the CCV 517 of the canister 510 is kept open (step S1027). When PT≦PT1 holds, the CCV 517 is closed (step S1031). The value PT1 is a pressure that is slightly higher than the atmospheric pressure. Therefore, the internal pressure of the pressurized and tightly closed purge system reduces. The purge system is tightly closed with the pressure being less than or equal to the predetermined pressure PT1 (closed at the atmospheric pressure).

Step S1033 is a step of determining the amount of fuel vapor produced ΔPV. In this embodiment, while the purge system is tightly closed at the atmospheric pressure, the increase in the internal pressure ΔPV that occurs in a set time (e.g., about 15 seconds) is detected by the pressure sensor 533. The detected value is used as an amount of fuel vapor produced.

If the measurement of the amount of fuel vapor produced ΔPV is completed as described above, or if it is determined in step S1025 that the measurement of ΔPV is completed in the past cycles of operation, step S1035 is subsequently executed. In step S1035, it is determined whether the amount of fuel vapor produced ΔPV is greater than a predetermined value ΔPV0. The value ΔPV0 is set at, for example, a value corresponding to several mmHg/15 seconds.

If ΔPV≦ΔPV0 in step S1035, that is, if the present amount of fuel vapor produced is small, it is considered that the value of ΔPL measured in step S1017 is small because of the absence of a leak, a hole or the like. In this case, the process proceeds to step S1037, in which it is determined that there is no abnormality, such as a leak, a hole, etc. (determination of normality). If ΔPV>ΔPV0 in step S1035, there is a possibility that the value ΔPL measured in step S1017 is small because of a great amount fuel vapor produced and there is an abnormality, such as a leak, a hole, etc. In this case, the process proceeds to step S1039, in which neither the determination of normality nor the determination of abnormality is made, that is, the determination is suspended.

Both the determination of normality in step S1037 and the suspension of determination in step S1039 are followed by step S1023 in FIG. 26, in which the CCV 517 of the canister 510 is opened. After that, the diagnostic operation ends.

As described above, in this embodiment, a pressure difference between the purge system internal pressure and the atmospheric pressure is produced by operating the purge pump, after a stoppage of the engine, in a direction opposite to the direction of the normal purge operation. Therefore, contrary to the normal purge operation, flows occur from the intake passage to the canister. The diagnostic of the purge system can also be performed, for example, in the construction shown in FIG. 17, by forwardly operating the purge pump to reduce the purge system internal pressure, and tightly closing the purge system under negative pressure. In this case, however, flows occur from the canister toward the intake passage, so that fuel vapor purged from the canister flows into the intake passage of the engine during the stoppage of the engine, thus causing a problem.

In contrast, in the case where the purge pump is reversely operated to cause a pressure difference between the purge system internal pressure and the atmospheric pressure as in the embodiment, there is no possibility of fuel vapor flowing from the canister into the intake passage. Therefore, the embodiment prevents fuel vapor from being discharged from the intake passage into the atmosphere at the time of a diagnostic operation.

Furthermore, in this embodiment, the diagnostic of the purge system is performed after the temperature of fuel in the fuel tank has becomes sufficiently low following a stoppage of the engine. Therefore, the effect of the amount of fuel vapor produced on the abnormality diagnostic is reduced, thus allowing an accurate diagnosis.

Although the embodiment is described above in conjunction with the construction shown in FIG. 17, other constructions can also achieve substantially the same advantages as in the case of the construction of FIG. 17. That is, entrance of fuel vapor into the intake passage is prevented and an accurate diagnosis can be performed by reversely operating the purge pump 520 after a stoppage of the engine, for example, in a canister purge system as illustrated in FIG. 26 in which the purge pump 520 is disposed at the atmospheric port side of the canister 510.

In this case, the purge system internal pressure becomes a negative pressure due to the reverse operation of the purge pump 520. Therefore, in this case, the pressure increasing rate ΔPL is measured in the closed purge system at a negative pressure in step S1017 in FIG. 26. This modified case differs from the operation of FIGS. 26 and 27 only in that it is determined whether ΔPL≦ΔPL0 in a step corresponding to step S1019 in FIG. 26, and if ΔPL≦ΔPL0, the determination of normality is immediately made in a step corresponding to step S1021, and that in a step corresponding to step S1037 in FIG. 26, the determination of abnormality is made instead of the determination of normality.

In the illustrated embodiment, the controller (the ECU) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A fuel vapor handling apparatus comprising:

a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;

a purge pump coupled to the canister to supply air into the canister via the atmospheric port so as to purge a fuel desorbed from the adsorbent into the intake pipe via the purge port; and a controller that controls the purge pump to intermittently operate during a purge operation.

2. The fuel vapor handling apparatus according to claim 1, further comprising a heater coupled to the canister to heat an interior of the canister.

3. The fuel vapor handling apparatus according to claim 1, wherein the controller controls a purge valve that changes between a first state to connect the canister and the intake pipe and a second state to disconnect the canister and the intake pipe, and wherein the controller causes the purge pump and the purge valve to intermittently operate with a timing such that opening of the purge valve is delayed by a predetermined time from a timing at which the purge pump turns on.

4. The fuel vapor handling apparatus according to claim 1, wherein the controller controls a purge valve that changes between a first state to connect the canister and the intake pipe and a second state to disconnect the canister and the intake pipe, and wherein the controller causes the purge pump and the purge valve to intermittently operate with a timing such that the purge valve closes and the purge pump turns off substantially synchronously.

5. The fuel vapor handling apparatus according to claim 3, wherein the controller causes the purge valve to close and the purge pump to turn substantially synchronously.

6. The fuel vapor handling apparatus according to claim 1, wherein the controller determines a number of on/off repetitions of the purge pump so that a cumulative amount of actual operating duration of the purge pump during an intermittent operation increases as an instructed purge amount increases.

7. The fuel vapor handling apparatus according to claim 1, further comprising a fuel vapor concentration sensor that is provided within a passage extending from the purge port to the intake pipe and that detects a concentration of the fuel vapor in the passage, wherein the controller stops operating the purge pump if the concentration of the fuel vapor reaches a pre-set purge completing concentration.

8. The fuel vapor handling apparatus according to claim 1, further comprising:

a fuel vapor concentration sensor that is provided within a passage extending from the purge port to the intake pipe and that detects a concentration of the fuel vapor in the passage; and wherein the controller adjusts an amount of flow of a purge fuel toward the intake pipe, and computes an amount of purged fuel based on the amount of flow of the purge fuel and a result of detection by the fuel vapor concentration sensor, to determine the amount of flow of the purge fuel so that the amount of purged fuel becomes within a pre-set range.

9. The fuel vapor handling apparatus according to claim 8, further comprising a heater that heats an interior of the canister,
wherein the controller controls the heater and the purge pump, so as to start operating the heater if the amount of purged fuel is not brought into the pre-set range by an operation of the purge pump while the heater is in a non-operation state.

10. The fuel vapor handling apparatus according to claim 8, further comprising a remaining fuel sensor that detects an amount of fuel remaining in the fuel tank,
wherein the controller stops operating the heater if the detected amount of fuel remaining becomes less than a pre-set lower limit amount.

11. The fuel vapor handling apparatus according to claim 10, wherein the controller stops operating the heater if the concentration of the fuel vapor becomes lower than a pre-set lower limit concentration.

12. The fuel vapor handling apparatus according to claim 8, further comprising a tank internal pressure sensor that detects an internal pressure of the fuel tank,
wherein the controller stops operating the heater if the internal pressure of the fuel tank becomes lower than a pre-set lower limit pressure.

13. A fuel vapor handling apparatus comprising:
a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;
a purge pump coupled to the canister to supply air into the canister via the atmospheric port so as to purge a fuel desorbed from the adsorbent into the intake pipe via the purge port;
a metering valve that is adapted to variably change a degree of opening of the atmospheric port; and
a controller that controls the metering valve to adjust the degree of opening of atmospheric port.

14. A fuel vapor handling apparatus comprising:
a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;
a purge pump coupled to the canister to supply air into the canister via the atmospheric port so as to purge a fuel desorbed from the adsorbent into the intake pipe via the purge port;
a heater that heats an interior of the canister; and
a controller that controls the purge pump and the heater, to operate the heater before starting operating the purge pump.

15. A fuel vapor handling apparatus comprising:
a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;
a purge pump coupled to the canister to supply air into the canister via the atmospheric port so as to purge a fuel desorbed from the adsorbent into the intake pipe via the purge port;
a refueling detecting sensor that detects whether the fuel tank has been refueled; and
a controller that controls the purge pump, so that the purge pump operates when refueling is performed.

16. A fuel vapor handling apparatus comprising:
a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;
a purge pump coupled to the canister to supply air into the canister via the atmospheric port so as to purge a fuel desorbed from the adsorbent into the intake pipe via the purge port;
a fuel vapor concentration sensor that is provided within a passage extending from the purge port to the intake pipe, and that detects a concentration of the fuel vapor in the passage; and
a controller that controls the purge pump, so that the purge pump operates if the concentration of the fuel vapor exceeds a pre-set purge staffing concentration.

17. A fuel vapor handling apparatus comprising:
a canister that includes a container that contains an adsorbent that adsorbs a fuel vapor from a fuel tank, the container having an atmospheric port that is open to an atmospheric pressure, a fuel vapor introducing port for connection to the fuel tank, and a purge port for connection to an intake pipe of an internal combustion engine;
a purge pump coupled to the canister to supply air into the canister via the atmospheric port so as to purge a fuel desorbed from the adsorbent into the intake pipe via the purge port;
a fuel vapor concentration sensor that is provided within a passage extending from the purge port to the intake pipe and that detects a concentration of the fuel vapor in the passage; and
a controller that controls the purge pump, wherein the controller computes an amount of purged fuel based on an amount of flow of a purge and a result of detection by the fuel vapor concentration sensor, and is set so that the purge pump operates if the concentration of the fuel vapor exceeds a pre-set purge starting concentration.

18. A diagnostic apparatus for detecting an operation abnormality of the fuel vapor handling apparatus of claim 1, comprising:
a purge valve between the canister and the intake pipe;
a pressure sensor in communication with a closed space defined by the canister and a fuel tank; and wherein the controller performs a diagnostic operation by:
controlling the purge valve to close and thereby disconnect communication between the canister and the intake pipe;
using the pressure sensor to detect a pressure in the closed space formed upon the disconnection from the intake pipe caused by the purge valve, the closed space including the canister and the fuel tank;
pressurizing the closed space by operating the purge pump while the purge valve is closed; and
determining an operation state of the purge pump based on an increasing rate of the pressure detected by the pressure sensor.

19. The diagnostic apparatus according to claim 18, wherein the controller compares the pressure detected by the pressure sensor with a target pressure, and compares a time of operation of the purge pump during a closed state of the purge valve with a pre-set upper limit time, and wherein the controller determines that the purge pump has an operation abnormality if the time of operation of the purge pump becomes longer than the upper limit time while the detected pressure is below the target pressure.

20. A canister purge system comprising:
   a canister that adsorbs a fuel vapor from a fuel tank of an internal combustion engine;
   a vapor passage that connects a space formed above a fuel liquid surface in the fuel tank to the canister;
   a purge passage that connects the canister and an engine intake passage;
   an atmospheric port that places the canister and an atmosphere in communication with each other;
   a purge pump coupled to the canister to supply a gas from the intake passage to the canister via the purge passage, the purge pump being operable independently of an operation of the engine; and
   a purge pump controller that supplies the fuel vapor remaining in the engine intake passage into the canister by operating the purge pump after the engine stops.

21. The canister purge system according to claim 20, wherein:
   the purge pump is a reversible pump, and the purge pump controller operates the purge pump in a forward direction so as to supply the fuel vapor from the canister to the engine intake passage via the purge passage during an operation of the engine, and the purge pump controller operates the purge pump in the reverse direction to supply the fuel vapor remaining in the engine intake passage into the canister after the engine stops.

22. The canister purge system according to claim 20, wherein the purge pump is disposed in the purge passage.

23. The canister purge system according to claim 20, wherein the purge pump is connected to the atmospheric port of the canister.

24. The canister purge system according to claim 20, wherein the purge pump controller suspends an operation of the purge pump if an engine temperature after the engine stops is not greater than a predetermined temperature.

25. The canister purge system according to claim 20, wherein the purge pump controller continues operating the purge pump in the reverse direction for a predetermined time after the engine stops, and then stops operating the purge pump, and wherein the purge pump controller deduces the predetermined time as an engine temperature after the engine stops increases.

26. The canister purge system according to claim 20, wherein the purge pump controller starts operating the purge pump after a predetermined delay time elapses following a stoppage of the engine, and the purge pump controller sets the predetermined delay time based on an engine temperature occurring when the engine stops.

27. The canister purge system according to claim 20, wherein if after a stoppage of the engine, the engine temperature rises above an engine temperature occurring at the stoppage of the engine, the purge pump controller operates the purge pump in accordance with the engine temperature rise.

28. The canister purge system according to claim 21, further comprising a diagnostic apparatus which, after a stoppage of the engine, causes the purge pump to operate in the reverse direction by using the purge pump controller, and thereby adjusts an internal pressure of a purge system that includes the purge passage, the canister and the fuel tank, to a value that provides a pressure difference relative to an atmospheric pressure, and which, after the internal pressure is adjusted, closes the purge system, and determines whether the purge system has a leak based on a change that occurs in the internal pressure of the purge system after the purge system is closed.

\* \* \* \* \*